(12) United States Patent
Hannaford et al.

(10) Patent No.: US 7,027,965 B2
(45) Date of Patent: Apr. 11, 2006

(54) TIME DOMAIN PASSIVITY CONTROL OF HAPTIC INTERFACES

(75) Inventors: Blake Hannaford, Seattle, WA (US); Jee-Hwan Ryu, Inchon (KR)

(73) Assignee: The University of Washington, Seattle, WA (US)

( * ) Notice: Subject to any disclaimer, the term of this patent is extended or adjusted under 35 U.S.C. 154(b) by 1098 days.

(21) Appl. No.: 09/952,022

(22) Filed: Sep. 13, 2001

(65) Prior Publication Data

US 2002/0062177 A1 May 23, 2002

Related U.S. Application Data

(60) Provisional application No. 60/292,135, filed on May 18, 2001, provisional application No. 60/232,134, filed on Sep. 13, 2000.

(51) Int. Cl.
*G06F 17/10* (2006.01)
*G06F 3/00* (2006.01)

(52) U.S. Cl. ............... 703/2; 703/7; 700/245; 715/701

(58) Field of Classification Search ............ 703/2, 703/7; 715/701; 700/245; 702/105; 345/144, 345/156, 179; 318/561
See application file for complete search history.

(56) References Cited

U.S. PATENT DOCUMENTS

| | | | | |
|---|---|---|---|---|
| 5,576,727 A | * | 11/1996 | Rosenberg et al. | 345/179 |
| 5,625,576 A | | 4/1997 | Massie et al. | 364/578 |
| 5,642,469 A | | 6/1997 | Hannaford et al. | 395/99 |
| 5,754,023 A | * | 5/1998 | Roston et al. | 318/561 |
| 5,802,353 A | | 9/1998 | Avila et al. | 395/500 |
| 5,880,714 A | * | 3/1999 | Rosenberg et al. | 345/156 |
| 5,898,599 A | | 4/1999 | Massie et al. | 364/578 |
| 5,987,454 A | | 11/1999 | Hobbs | 707/4 |
| 6,005,551 A | | 12/1999 | Osborne et al. | 345/161 |
| 6,046,563 A | | 4/2000 | Moreyra | 318/567 |
| 6,046,727 A | * | 4/2000 | Rosenberg et al. | 345/156 |
| 6,075,475 A | * | 6/2000 | Ellis et al. | 341/144 |
| 6,084,587 A | | 7/2000 | Tarr et al. | 345/419 |

(Continued)

OTHER PUBLICATIONS

Maneewam et al., T. Haptic Feedback of Kinematic Conditioning for Telerobotic Applicatioons, 1988 IEEE/RSJ International Conference on Intelligent Robots and Systems, vol. 2, Oct. 1998, pp. 1260-1265.*

(Continued)

*Primary Examiner*—Russell Frejd
(74) *Attorney, Agent, or Firm*—Greenlee, Winner and Sullivan, P.C.

(57) ABSTRACT

Methods are provided for stabilizing a haptic interface of a computer-controlled one-port virtual-reality system or a two-port teleoperation system comprising a robot manipulator. "Stabilizing" means to reduce the sense of vibration in a haptic interface. A Passivity Observer is computed to measure the amount of energy produced at the haptic interface, and a Passivity Controller is calculated to damp or absorb excess energy which causes the sense of vibration. This invention also provides a "filter," i.e. a threshold function which returns zero velocity if the computed estimated velocity is less than a small predetermined value, which may be applied to estimated velocities determined in impedance-based methods of this invention so as to remove noise in the velocity estimate. To improve speed of reaction of the systems, this invention also provides methods for resetting the Passivity Observer to zero when it has been too positive for too long a period of time. Systems implementing these methods are also provided.

63 Claims, 30 Drawing Sheets

U.S. PATENT DOCUMENTS

| | | | |
|---|---|---|---|
| 6,111,577 A | 8/2000 | Zilles et al. | 345/355 |
| 6,131,097 A | 10/2000 | Peurach et al. | 707/102 |
| 6,283,859 B1 | 9/2001 | Carlson et al. | 463/36 |

OTHER PUBLICATIONS

Hannaford et al., B. Time Domain Passivity Control of Haptic Interfaces, Proceedings 2001 ICRA, IEEE International Conference on Robotics and Automation, vol. 2, 2001, pp. 1863-1869.*

Kim et al., Y.S. Some Practical Issues in Time Domain Passivity Control of Haptic Interfaces, 2001 IEEE/RSJ International Conference on Intelligent Robots and Systems, vol. 3, Oct.-Nov. 2001, pp. 1744-1750.*

Adams et al., R.J. Stable Haptic Interaction with Virtual Environments, IEEE Transactions on Robotics and Automation, vol. 15, No. 3, Jun. 1999, pp. 465-474.*

Adams, R.J. et al., "Excalibur, A Three-Axis Force Display," (Nov. 1999) Proc. ASME International Mechanical Engineering Congress and Exhibition, Nashville, TN, pp. 1-8.

Adams, R.J. et al., "Stable Haptic Interaction Using the Excalibur Force Display," (Apr. 2000) *IEEE Int. Conf. on Robotics and Automation*, vol. 15, No. 3, pp. 465-474.

Adams, R.J. and Hannaford, B., "A Two-Port Framework for the Design of Unconditionally Stable Haptic Interfaces," (1998) *Proc. 1998 IEEE/RSJ Int. Conf. on Intelligent Robots and Systems*, pp. 1254-1259.

Buttolo, P. et al., "Architectures for Shared Haptic Virtual Environments," (1997) *Architectures for Shared Haptic Virtual Environments, Computer & Graphics*, pp. 1-10.

Buttolo, P. and Hannaford, B., "Pen-Based Force Display for Precision Manipulation in Virtual Environments," (Mar. 1995) *Proc. IEEE Virtual Reality Ann. Int. Symp.*, pp. 217-224.

Kim, Y.S. and Hannaford, B., "Some Practical Issues in Time Domain Passivity Control of Haptic Interfaces," (Oct. 2001), *Proc. IROS 2001, Maui, Hawaii*, abstract only.

Maneewarn, T. et al., "Haptic Rendering for Internal Content of an Implicit Object," (Nov. 1998) *ASME Winter Annual Meeting Symposium*.

Miller, B.E. et al., "Environment Delay in Haptic Systems," (Apr. 2000) *Proc. 2000 IEEE Int. Conf. on Robotics & Automation*, pp. 2434-2439.

Raju, G.J. et al., "Design Issues in 2-port Network Models of Bilateral Remote Manipulation," (1989) *IEEE*, pp. 1316-1321.

Yokokohji, Y. et al., "Bilateral Control with Energy Balance Monitoring under Time-Varying Communication Delay," (Apr. 2000) *Proc. 2000 IEEE Int. Conf. on Robotics & Automation*, pp. 2684-2689.

* cited by examiner

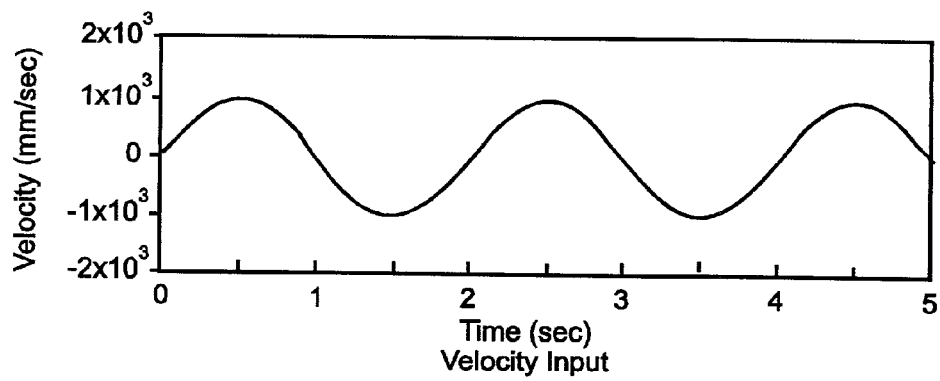
FIG. 11A Velocity Input
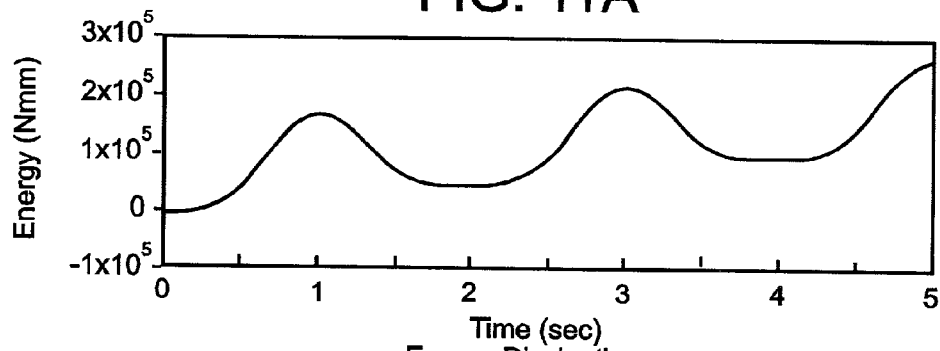
FIG. 11B Energy Dissipation
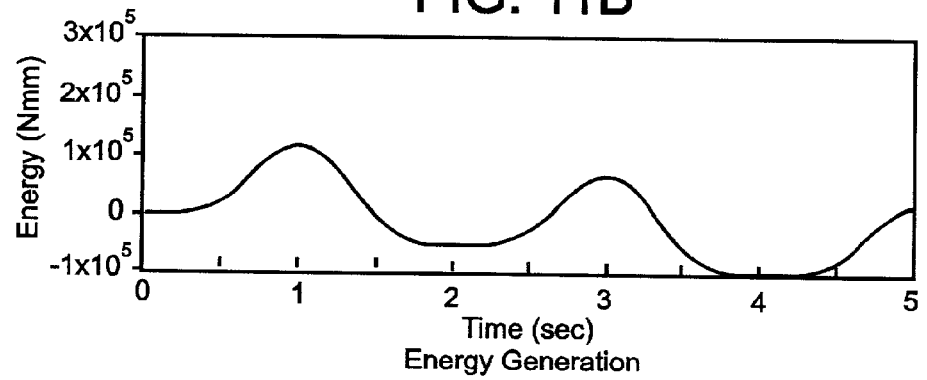
FIG. 11C Energy Generation
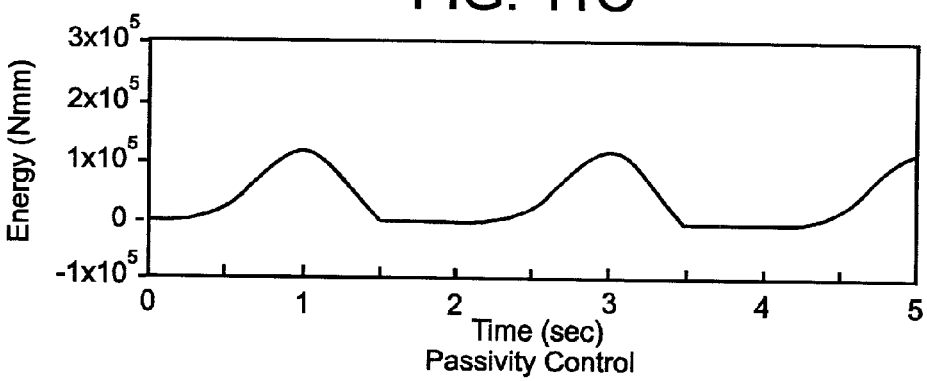
FIG. 11D Passivity Control

TIME DOMAIN PASSIVITY CONTROL OF HAPTIC INTERFACES

CROSS-REFERENCE TO RELATED APPLICATIONS

This application claims priority to U.S. Patent Application Ser. No. 60/232,134 filed Sep. 13, 2000 and U.S. Patent Application Ser. No. 60/292,135 filed May 18, 2001, both of which are incorporated herein by reference to the extent not inconsistent herewith.

BACKGROUND OF THE INVENTION

Humans interact with their surrounding environment through five sensory channels, popularly labeled "sight," "sound," "taste," "smell," and "touch." It is our sense of touch which provides us with much of the information necessary to modify and manipulate the world around us. The word haptic refers to something "of or relating to the sense of touch" (Hogan, N., "Impedance Control: An Approach to Manipulation: Part I—Theory," Journal of Dynamic Systems, Measurement, and Control, vol. 107, pp. 1–7, 1985) conveying information on physical properties such as inertia, friction, compliance, temperature, and roughness. This sense can be divided into two categories: the kinesthetic sense, through which we sense movement or force in muscles and joints; and the tactile sense, through which we sense shapes and textures. This invention is concerned primarily with haptic interactions involving the use of the kinesthetic sense in virtual environments.

Haptics research grew rapidly in the 1990s as researchers and corporations discovered more uses for force feedback technology. One important catalyst in this frenzy of research was the development and commercialization of the PHANTOM family of haptic displays (Massie, T. H. and Salisbury J. K., "The Phantom Haptic Interface: A Device for Probing Virtual Objects," Proc. ASME International Mechanical Engineering Congress and Exhibition, Chicago, pp. 295–302, 1994). At the University of Washington, a small, portable, desk-top system was developed for interaction with three degree-of-freedom environments, the Pen Based Force Display (PBFD) (Buttolo, P. and Hannaford, B., "Pen Based Force Display for Precision Manipulation of Virtual Environments," Proc. IEEE Virtual Reality Annual Int. Symposium, Raleigh, N.C., pp. 217–225, 1995). Another compact master device, developed at IBM and Carnegie Mellon University for teleoperation, departs from more conventional designs by suspending the handle using magnetic levitation (Hollis, R. L., Salcudean, S. E., and Allan, A. P., "A Six-Degree-of-Freedom Magnetically Levitated Variable Compliance Fine-Motion Wrist: Design, Modeling, and Control," IEEE Trans. Robotics and Automation, vol. 7, no. 3, pp. 320–332, 1991). Subsequent versions of the device have been used at the University of British Columbia as haptic interfaces to virtual environments (Salcudean, S. E., Wong, N. M., and Hollis, R. L., "Design and Control of a Force-Reacting Teleoperation System with Magnetically Levitated Master and Wrist," IEEE Trans. Robotics and Automation, vol. 11, no. 6, pp. 844–858, 1995; Salcudean, S. E., and Vlaar, T. D., "On the Emulation of Stiff Walls and Static Friction with a Magnetically Levitated Input-Output Device," Trans. ASNE, Journal of Dynamic Systems, Measurement, and Control, vol. 119, no. 1, pp. 127–132, 1997).

While small desk-top manipulanda, such as those mentioned above, are useful for many applications, others demand a much larger workspace and higher force output. The University of Washington High-Bandwidth Force Display (HBFD)(Moreyra, M. R., "Design of a Planar High Bandwidth Force Display with Force Sensing," M. S. Thesis, University of Washington, Department of Electrical Engineering, Seattle, 1996) and Excalibur (Adams, R. J., Moreyra, M. R., Hannaford, B., "Excalibur—A Three Axis Force Display," Proc. ASME International Mechanical Engineering Congress and Exhibition, Nashville, Tenn., 1999) provide large workspace and high forces through direct drive motors and a novel steel cable transmission. In contrast to manipulanda which provide forces only to the user's hand or fingers, exoskeletal systems may generate sensations affecting an entire limb. One such device was developed at the Scuola Superiore Sant' Anna in Pisa, Italy (Bergamasco, M., et al., "An Arm Exoskeleton System for Teleoperation and Virtual Environments Applications," Proc. IEEE Int. Conf. Robotics and Automation, Los Alamitos, Calif., pp. 1449–54, 1994). The Sarcos Dexterous Arm Master is another exoskeleton-like system with contact points at the forearm and upper arm of the user and is being used to provide force feedback in CAD applications (Maekawa, H., and Hollerbach, J. M., "Haptic Display for Object Grasping and Manipulating in Virtual Environment," Proc. IEEE Int. Conf. Robotics and Automation, Leuven, Belgium, pp. 2566–73, 1998).

The early history of force feedback technology, dominated by research applications, changed in 1996 when CH Products released the first consumer level haptic display, the Force FX joystick. Microsoft entered the market in 1997 with the Sidewinder Force Feedback Pro joystick. By working with the Immersion Corporation to integrate force feedback technology into the industry standard DirectX API, they gained rapid acceptance among programmers. Logitech joined the mix in 1998 with the WingMan Force joystick, a cable-driven device which raised the bar for fidelity in consumer haptic systems. The consumer market penetration of haptics continues with the arrival of numerous force feedback steering wheels for use with racing simulators.

Virtual environments of interest are always non-linear and the dynamic properties of a human operator are always involved. These factors make it difficult to analyze haptic systems in terms of known parameters and linear control theory. One discipline which becomes more important with the rapid growth of haptics is control engineering. The control engineer is concerned with ensuring the haptic system, including the haptic display, the application software, and the human operator, remains stable while creating a compelling sense of haptic presence.

Early efforts for control in haptics can be found in the adaptation of two-port network theory to the analysis of teleoperators and passivity criteria to design control gains for a master-slave manipulator (Raju, G. J., Verghese G. C., and Sheridan T. B., "Design Issues in 2-port Network Models of Bilateral Remote Manipulation," Proc. IEEE Int. Conf. Robotics and Automation, Scottsdale, Ariz., pp. 1316–21, 1989; Hannaford, B., "A Design Framework for Teleoperators with Kinesthetic Feedback," IEEE Trans. Robotics and Automation, vol. 5, no. 4, pp. 426–434, 1989; Hannaford, B., "Stability and Performance Trade Offs in Bi-Lateral Telemanipulation," Proc. IEEE Int. Conf. Robotics and Automation, Scottsdale, Ariz., pp. 1764–7, 1989; Anderson, R. J. and Spong, M. W., "Bilateral Control of Teleoperators with Time Delay," IEEE Trans. Automatic Control, vol. 34, no. 5, pp. 494–501, 1989). In the mid-1980s, Neville Hogan discovered that while the neuromuscular system is internally complex, it exhibits externally simple, spring-like behavior (Hogan, N., "Multivariable Mechanics of the Neuromuscular System," Proc. IEEE Annual Conference of the Engineering in Medicine and Biology Society, pp. 594–98, 1986). The significance of this result is that the human arm can be assumed stable when coupled to any external system which is itself passive. Human arm impedance can therefore be considered as passive for the purposes of studying system stability.

Faster and cheaper computer growth has enabled haptic feedback with increasingly complex virtual reality simulations, but the stability of haptic feedback now depends on the intricate interactions taking place in the virtual world, adding complex geometry to the factors affecting stability. One of the most significant problems in haptic interface design is to create a control system which simultaneously is stable (i.e., does not exhibit vibration or divergent behavior) and gives high fidelity under any operating conditions and for any virtual environment parameters. This presents a classic engineering trade off since realism of the haptic interface (for example in terms of stiffness of "hard" objects) must often be reduced in order to guarantee totally stable operation. In 1995, Colgate, Stanley, and Brown proposed the introduction of a "virtual coupling" between the haptic display and the virtual environment to deal with this problem (Colgate, J. E., Stanley, M. C., and Brown, J. M., "Issues in the Haptic Display of Tool Use," Proc. IEEE RSJ Int. Conf. Intelligent Robots and Systems, Pittsburgh, Pa., pp. 140–145, 1995). J. Michael Brown explored conditions under which the virtual coupling parameters guaranteed a passive interface to the human operator. He developed design criteria for an arbitrary discrete-time passive environment (Brown, J. M. and Colgate, J. E., "Passive Implementation of Multibody Simulations for Haptic Display," Proc. ASME International Mechanical Engineering Congress and Exhibition, Dallas, Tex., pp. 85–92, 1997) and for a non-passive virtual mass simulation (Brown, J. M. and Colgate, J. E., "Minimum Mass for Haptic Display Simulations," Proc. ASME International Mechanical Engineering Congress and Exhibition, Anaheim, Calif., pp. 249–56, 1998). Zilles and Salisbury from the MIT Artificial Intelligence Laboratory presented their own technique for stable haptic rendering of complex virtual objects (Zilles, C. B. and Salisbury, J. K., "A Constraint-based God-object Method for Haptic Display," Proc. IEEE/RSJ Int. Conf. on Intelligent Robots and Systems, Pittsburgh, Pa., pp. 146–151, 1995). Their approach was to servo the haptic display to an artificial "god-object" which conformed to the virtual environment. MIT's god-object was actually a special case of Northwestern's virtual coupling, for point contact with a static virtual environment. The above-mentioned two works were complementary in the sense that Northwestern provided a strong theoretical basis while MIT demonstrated a relatively sophisticated application of the approach.

The virtual coupling is a virtual mechanical system containing a combination of series and parallel elements interposed between the haptic interface and the virtual environment to limit the maximum or minimum impedance presented by the virtual environment in such a way as to guarantee stability. Particulars of virtual coupling design depend the causality of the virtual environment and the haptic device. By causality, we refer to the selection of velocity or force as input and its complement (force or velocity) as output. Possible virtual environment (VE) causalities include impedance based (position/velocity input, force output), admittance based (force input, position/velocity output), or constraint based (position input/position output). While important, the virtual coupling idea considered only one class of haptic displays, "impedance displays" which measure motion and display force. A second class, "admittance displays" which measure force and display motion, was not considered.

The virtual coupling promotes stability by placing an upper limit on the mechanical impedance which can be displayed to the operator. The virtual coupling also inherently distorts the haptic properties built into the virtual environment, reducing environment stiffness and damping in most cases. In the case of an impedance based environment (typical of many implemented systems), a virtual spring and damper in parallel are typically connected in series between the haptic interface and the virtual environment. Stability in this case depends inversely on the stiffness being rendered by the system and the series stiffness has the effect of setting the maximum stiffness. Correct selection of the virtual coupling parameters will allow the highest possible stiffness without introducing instability. The virtual coupling parameters can be set empirically, but a theoretical design procedure is desirable. Because interesting virtual environments are always non-linear and the dynamic properties of a human operator are always involved, it is difficult to analyze haptic systems in terms of known parameters and linear control theory. One fruitful approach is to use the idea of passivity to guarantee stable operation.

The major problem with using passivity for design of haptic interaction systems is that it is overly conservative. Adams et al. derived a method of virtual coupling design from two-port network theory which applied to all causality combinations and was less conservative than passivity based design (Adams, R. J. and Hannaford, B., "Stable Haptic Interaction with Virtual Environments," IEEE Trans. Robotics and Automation, vol. 15, no. 3, pp. 465–474, 1999; Adams, R. J., Moreyra, M. R., Hannaford, B., "Stability and Performance of Haptic Displays: Theory and Experiments," Proc. ASME International Mechanical Engineering Congress and Exhibition, Anaheim, Calif., pp. 227–34, 1998; Adams, R. J., Klowden, D., Hannaford, B., "Stable Haptic Interaction using the Excalibur Force Display," Proc. IEEE Int. Conf. Robotics and Automation, San Francisco, Calif., 2000, pp. 770–775). They were able to derive optimal virtual coupling parameters using a dynamic model of the haptic device and by satisfying Lewellyn's "absolute stability criterion," an inequality composed of terms in the two-port description of the combined haptic interface and virtual coupling system. This procedure guaranteed a stable and high performance virtual coupling as long as the virtual environment was passive. Miller, Colgate, and Freeman have derived another design procedure which extends the analysis to non-linear environments and extracts a damping parameter to guarantee stable operation (Miller, B. E., Colgate, J. E., and Freeman, R. A., "Passive Implementation for a Class of Static Nonlinear Environments in Haptic Display," Proc. IEEE Int. Conf. Robotics and Automation, Detroit, Mich., May, 1999, pp. 2937–2942; Miller, B. E., Colgate, J. E., and Freeman, R. A., "Computational Delay and Free Mode Environment Design for Haptic Display," Proc. ASME Dyn. Syst. Cont. Div., 1999; Miller, B. E., Colgate, J. E., and Freeman, R. A., "Environment Delay in Haptic Systems," Proc. IEEE Int. Conf. Robotics and Automation, San Francisco, Calif., April, 2000, pp. 2434–2439).

U.S. Patents dealing with haptic interfaces include: U.S. Pat. Nos. 6,111,577; 5,625,576; 6,084,587; and 5,898,599.

All publications referred to herein are incorporated by reference to the extent not inconsistent herewith.

SUMMARY OF THE INVENTION

This invention provides a method for stabilizing a one-port virtual-reality system comprising a haptic interface or a two-port teleoperation system comprising a haptic interface, a computer control system and a remote robot manipulator.

The term "stabilizing" means to reduce or minimize the sense of "vibration" or bounce when the user encounters a virtual object, i.e. to minimize vibrational force exerted back on the user by an actual system element or elements as a result of calculations performed by a processor in the system causing movement of such actual system elements in simulating response by virtual objects or by robot end effectors. For example, when one virtual object, virtually held in the user's hand, contacts another virtual object, in an unstable system, most often when the second object is rigid and fixed or very massive, the user's hand and the object it holds will appear to bounce away from the other object. If the user applies force, they will approach each other again and again. "Stabilization" also means reducing the appearance of a virtual object bouncing away from the user or from another virtual object.

In one embodiment, involving a virtual-reality system comprising a haptic device having an interface between a user and a virtual environment, the method of this invention for stabilizing said interface comprises:

(a) determining movement of a user's body in contact with an actual element at the haptic interface over a current time increment;

(b) calculating a force which should be applied back to the user through an actual element at the haptic interface in contact with the user in order to simulate resistance by a virtual object in the virtual environment to the movement of the user;

(c) computing a Passivity Observer which is a measure of a positive amount of energy dissipated or a negative amount of energy produced by a virtual object at the haptic interface;

(d) determining whether net energy is produced by the virtual object (i.e. whether the Passivity Observer is negative) or is dissipated by the virtual object (i.e. whether the Passivity Observer is positive);

(e) when said determination shows that the virtual object is producing energy, computing a Passivity Controller to determine the amount of damping required to absorb the net energy computed as the Passivity Observer;

(f) modifying the force of step (b) and applying said modified force back to the user such that the net energy computed as the Passivity Controller is absorbed; and (g) repeating the foregoing steps over successive time increments.

As is known to the art, a haptic interface is a device comprising sensors and actuators for sensing movement or force applied by a user and returning the appropriate force or movement in response.

Rather than, or in addition to sensing movement of the user, the method may instead sense force applied by the user. In this case, the method of this invention comprises:

(a) determining the force being applied by a user to an actual element at the haptic interface at a current time increment;

(b) calculating the apparent velocity of the movement which should be displayed by a virtual object in response to said force;

(c) computing a Passivity Observer which is a measure of a positive amount of energy dissipated or a negative amount of energy produced by a virtual object at the haptic interface;

(d) determining whether net energy is produced by the virtual object (i.e. whether the Passivity Observer is negative) or is dissipated by the virtual object (i.e. whether the Passivity Observer is positive);

(e) when said determination shows that the virtual object is producing energy, computing a Passivity Controller to determine the amount of damping required to absorb the net energy computed as the Passivity Observer;

(f) modifying the apparent velocity of the virtual object of step (b) and displaying said velocity such that the net energy computed as the Passivity Controller is absorbed; and (g) repeating the foregoing steps over successive time increments.

The movement of the actual system element, such as a joystick, is preferably determined by measuring the position of the element at one point in time, comparing this position with its position at a previous point in time and computing the velocity of the movement.

As is known to the art, the force which should be applied back to the user through an actual system element is calculated in accordance with system parameters including whether or not the position of the actual element corresponds to the position of a virtual object in the virtual environment of the system, the virtual weight of the virtual object, the virtual mass of the virtual object doing the manipulating of the virtual object, and the velocity of the movement by the operator.

Computing the Passivity Observer is done by the processor in the system by integrating the power being exerted back on the user adjusted by a varying damping (also called energy dissipating) factor over time. The first value of this damping factor is taken to be zero. It is recomputed at each successive time interval. A negative value of the Passivity Observer means that the virtual object is generating energy. In an ordinary, unstabilized system, on contacting the virtual object the user would experience a series of vibrations or "bounces." Therefore, a damping factor referred to herein as the "Passivity Controller" is calculated in order to reduce the amount of force the computer processor of the system should direct an actual system element to apply back against the user. Preferably, the Passivity Controller directs the system to modify (by decreasing) electric current going to a motor so that the motor will apply the proper force back against the user.

The steps of this method are repeated many times per second, e.g. from about 100 to about 4000 times per second, preferably about 1000 times per second.

The methods of this invention preferably include a resetting step wherein the Passivity Observer is reset to zero when it has been too positive for too long a period of time. This involves resetting the Passivity Observer is to zero according to a heuristic rule which determines when the Passivity Observer is no longer relevant to the state of contact between the virtual environment and the user. For example if the system has been simulating contact between a user and an object, and that contact ceases, or contact with a different object begins, the value of the Passivity Observer may not be relevant to the current situation. The virtual environment, unlike the real environment, contains sources of energy in order to simulate haptic responses. Thus the system may accumulate more energy than is needed for the simulated responses. If the system is unstable and is simulating "bouncing" when the Passivity Observer is positive, the Passivity Observer will become less with each bounce, but it would be desirable to simply reset the Passivity Observer to zero under these conditions.

Resetting to zero should occur between "bounces." Thus a heuristic resetting rule is one which depends on parameters of the particular system, and is easily determined without undue experimentation in accordance with the teachings herein. In the embodiments described herein, the heuristic rule is one that detects a state of lack of contact between the user and objects in the virtual environment. The state of lack of contact may be detected when the amount of force being applied by the user exceeds a predetermined limit $\epsilon$ for a predetermined period of time $\tau$. The values for $\epsilon$ and $\tau$ are experimentally determined. In embodiments described herein, $\epsilon$ is between about $10^{-1}$ and about $10^{-7}$ times the maximum amount of force the system is capable of exerting, preferably $\epsilon$ is about $10^{-3}$ times the maximum amount of force the system is capable of exerting. In these systems, $\tau$ is between the time increments ($1000 \times 10^{-3}$ sec) being used for successive iterations of steps (a) through (f) and about 100 times said time increment. Preferably $\tau$ is about ten times said time increment.

Rules for resetting the Passivity Observer in accordance with the teachings hereof can be derived for different systems by those of skill in the art without undue experimentation based on system performance parameters.

The methods of this invention may also comprise applying a "filter" to the estimated velocities determined in impedance-based methods so as to remove noise in the velocity estimates as described in the Examples hereof. This "filter" is a threshold function which returns zero velocity if the computed estimated velocity is less than a small predetermined value, which can be determined for the particular system in accordance with the teachings herein without undue experimentation.

The methods described above may be adapted to teleoperator or telerobotic systems comprising haptic interfaces, such as master/slave systems, in which there is a haptic interface between the user and a control system comprising a computer processor controlling a robot device which performs manipulations in a real environment. The force being applied back against the user is modified by a Passivity Controller while the force applied by the robot device to the real environment is modified by a Passivity Controller; or the velocities displayed for virtual objects in the haptic interface and the robot end effector are modified by a Passivity Controller in response to forces being exerted by the user or on the robot arm.

Using impedance causality in such systems, the sensors provide information to a computer processor as to the position of the user's body and the robot arm, from which the processor derives respective velocities of the user's body and robot arm. Based on differences between these velocities, the processor commands in opposite directions to the movements of the user and the robot arm which causes them to move together, i.e. minimizes the differences between their positions and velocities. The computer code effecting this method may be referred to herein as a "control system" or a "controller."

In a system with impedance causality, the method is described as follows: In a teleoperation system comprising a haptic interface, a control system, and a robot effector in contact with a real environment, a method for stabilizing said teleoperation system, said method comprising:

(a) determining the movement of the user and of a robot end effector over a current time increment;

(b) calculating the forces which should be applied by an actual element at the haptic interface to the user, and by the robot end effector to the virtual environment, in order to synchronize motion of the robot and the user and to transmit appropriate force information back to the user to simulate resistance to movement of the robot end effector;

(c) computing a Passivity Observer which is a measure of a positive amount of energy dissipated or a negative amount of energy produced by the control system between the haptic interface and the robot;

(d) determining whether net energy is produced by the control system (i.e. whether the Passivity Observer is negative) or is dissipated by the control system (i.e. whether the Passivity Observer is positive);

(e) when said determination shows that the control system is producing energy, computing a Passivity Controller to determine the amount of damping required to absorb the net energy computed by the Passivity Observer;

(f) modifying the forces of step (b) and applying a modified force back to the user by the actual element at the haptic interface, and applying a modified force to the real environment by the robot end effector so as to reduce the net energy by the amount computed as the Passivity Controller;

(g) repeating the foregoing steps over successive time increments.

In addition to using "impedance causality," the teleoperation and telerobotic methods of this invention may also be adapted to systems using "admittance causality." Admittance causality is more appropriate than impedance causality to systems involving high gear ratios and massive actual system components because these are difficult for the human user to move. (Known in the art as "non-backdrivable" systems.) Teleoperation and telerobotic systems may utilize the methods of this invention through impedance causality or admittance causality, or combinations thereof, e.g., either admittance causality or impedance causality, as applied to the user/haptic interface, combined with either impedance causality or admittance causality as applied to the control system/robot, as appropriate. The damping force can be placed either at the user side or the robot side, or both, or can be moved back and forth dynamically.

This invention also provides virtual-reality systems which carry out the above-described methods. These systems comprising a haptic interface device providing a stabilized haptic interface. Components of the system include: a digital processor operatively connected to the haptic interface device, input/output devices for transmitting signals from said digital computer to the haptic interface device, the haptic interface device being programmed with virtual reality modeling software capable of computing forces of interaction between actual components of the device and virtual objects in a virtual environment produced by said device; between a user and a virtual environment. The system also comprises:

(a) sensors, which may be computer-controlled force/torque sensors, for determining movement of a user's body in contact with an actual element over a current time increment, and/or computer-controlled digital or analog position sensors operatively connected to an actual element at the haptic interface to which a user applies force for determining the force being applied thereto by the user at a current time increment over a current time increment;

(b) a digital processor programmed as follows:

(i) when force was determined in paragraph (a), the processor is programmed to calculate the apparent velocity of the movement which should be displayed by a virtual object in response to said force; and when movement was determined in paragraph (a), the processor is programmed to calculate a force which should be applied back to the user through an actual element at the haptic interface in contact with the user, in order to simulate resistance by a virtual object in the virtual environment to the movement of the user;

(ii) the processor is also programmed to compute a Passivity Observer which is a measure of a positive amount of energy dissipated or a negative amount of energy produced by a virtual object at the haptic interface; and (iii) the processor is further programmed to determine whether net energy is produced by the virtual object (i.e. whether the Passivity Observer is negative) or is dissipated by the virtual object (i.e. whether the Passivity Observer is positive);

(iv) when said determination shows that the virtual object is producing energy, the processor is programmed to compute a Passivity Controller to determine the amount of damping required to absorb the net energy computed as the Passivity Observer;

(v) when force/torque sensors were used to determine force applied by the user, the processor is programmed to modify the apparent velocity of the virtual object of paragraph (b) and display said velocity such that the net energy computed as the Passivity Controller is absorbed; and when position sensors were used to determine movement of the user, the processor is programmed to produce a signal modifying the force of paragraph (b);

(c) the system also comprises means, such as hydraulically or electrically powered means, e.g., a motor, for applying said modified force back to the user such that the net energy computed as the Passivity Controller is absorbed;

(d) the digital processor is also programmed to repeatedly activate the sensors of paragraph (a) at successive time increments.

Both position and force/torque sensors may be used in the same system.

The processor may also be programmed to apply a "filter" as described above to the estimated velocity so as to remove noise in the velocity estimate.

The processor may also be programmed to reset the Passivity Observer to zero according to a heuristic rule which determines when the Passivity Observer is no longer relevant to the state of contact between the virtual environment and the user as described.

This invention also provides teleoperation (also including telerobotic) systems. These systems comprise a stabilized haptic interface between a user and the control system, and a robot controlled by the control system. The systems also comprise:

(a) position sensors for determining the movement of the user and/or of a robot end effector over a current time increment; and/or force/torque sensors for determining the force being applied by a user and/or a robot end effector to a real environment at a current time increment;

(b) a digital processor programmed as follows:

(i) when movement was determined in paragraph (a), the processor is programmed to calculate the corresponding force which should be applied by an actual element at the haptic interface to the user, or by the robot end effector to the real environment, or both, in order to synchronize motion of the robot and the user and to transmit appropriate force information back to the user to simulate resistance to movement of the robot end effector; and when force being applied by a user or a robot end effector was determined in paragraph (a), the processor is programmed to calculate the apparent velocity of the movement which should be applied to the user at the haptic interface and/or applied to the real environment via the robot end effector in response to either or both of said forces;

(ii) the processor is also programmed to compute a Passivity Observer which is a measure of a positive amount of energy dissipated or a negative amount of energy produced by the control system between the haptic interface and the robot and/or between the haptic interface and the user;

(iii) the processor is also programmed in each case described in paragraph (ii), to determine whether net energy is produced by the control system (i.e. whether the Passivity Observer is negative) or is dissipated by the control system (i.e. whether the Passivity Observer is positive);

(iv) when said determination shows that the control system is producing energy, the processor is also programmed to compute a Passivity Controller to determine the amount of damping required to absorb the net energy computed by the Passivity Observer;

(v) when position sensors were used to determine movement of the user in paragraph (a), the processor is programmed to produce a signal to modify the force back to the user from the virtual environment; and/or when position sensors were used to determine movement by the robot end effector in paragraph (a) the processor is programmed to produce a signal to modify the force applied to the real environment by the robot end effector; when force/torque sensors were used to determine force applied by the user or the robot end effector in paragraph (a), the processor is programmed to produce a signal modifying the velocity of the robot end effector of paragraph (b) and display said velocity; said modifications being calculated so as to reduce the net energy by the amount computed as the Passivity Controller; and (vi) to activate said sensors of paragraph (a) at successive time increments.

(c) The system also comprises means, such as motors, for moving said actual element and/or said robot end effector in response to signals from said processor.

Force/torque sensors and/or position sensors may be used in any combination at the interfaces as dictated by the needs of the system. Specifically, the system may comprise force/torque sensors to determine force being exerted by the user and force/torque sensors to determine force being exerted by the robot end effector, force/torque sensors to determine force being exerted by the user and position sensors to determine movement of the robot end effector; or position sensors to determine movement of the user and force/torque sensors to determine force being exerted by the robot end effector; or position sensors to determine movement of the user and position sensors to determine movement of the robot end effector. Again, as above, the processor may be programmed to apply threshold velocity filters to velocity estimates as described above and to reset the Passivity Observer according to a heuristic rule as described above.

BRIEF DESCRIPTION OF THE DRAWINGS

FIG. 11 shows a simulation response for simple virtual wall system. When driven by a sinusoidal velocity profile (a), the system dissipates energy when damping is positive (b) and generates energy when damping is negative (c). When wall damping is still negative and the Passivity Controller is operating, dissipation is constrained to be positive (d) and system is stable.

DETAILED DESCRIPTION

The present invention provides a method for controlling stability of operation in haptic interfaces for multi-port systems including those for one-port systems (e.g., a human interfacing with a virtual environment) and two-port systems (e.g., a human interfacing with a robot). The methods of the invention can be implemented in various haptic interface configurations in which the causality of the haptic device and the virtual environment are impedance based, admittance based or constraint based. The methods are based on passivity of the interface system. A passive system is stable. The methods of this invention apply a Passivity Observer which monitors forces and velocities in a haptic interface system and determines if the system is passive. If the system is not passive (i.e., is not stable), the method calculates how much energy must be dissipated to render the system passive. The method applies a Passivity Controller in the form of a time varying element to dissipate only the amount of energy required to stabilize the system. The Passivity Observer and Passivity Controller of this invention are readily implemented in view of descriptions herein, by conventional programming methods for various types of haptic interfaces. The Passivity Observer and Passivity Controller of this invention together provide for system stability without excessive damping. The method of this invention is particularly useful for application to slow computing environments, such as would be encountered in complex simulations.

Passivity is a sufficient condition for stability which has the following attractive features: (1) Uses intuitively attractive energy concepts (a system is passive if and only if the energy flowing in exceeds the energy flowing out for all time); (2) allows a global stability conclusion to be drawn from considering system blocks individually; and (3) applies to linear and non-linear systems. Experience shows that it is safe to assume the human operator is passive at frequencies of interest.

In a specific embodiment, the method of this invention includes a resetting step which is applied periodically, or in response to the occurrence of a selected event, to reset the Passivity Observer to zero.

Figure 1A:
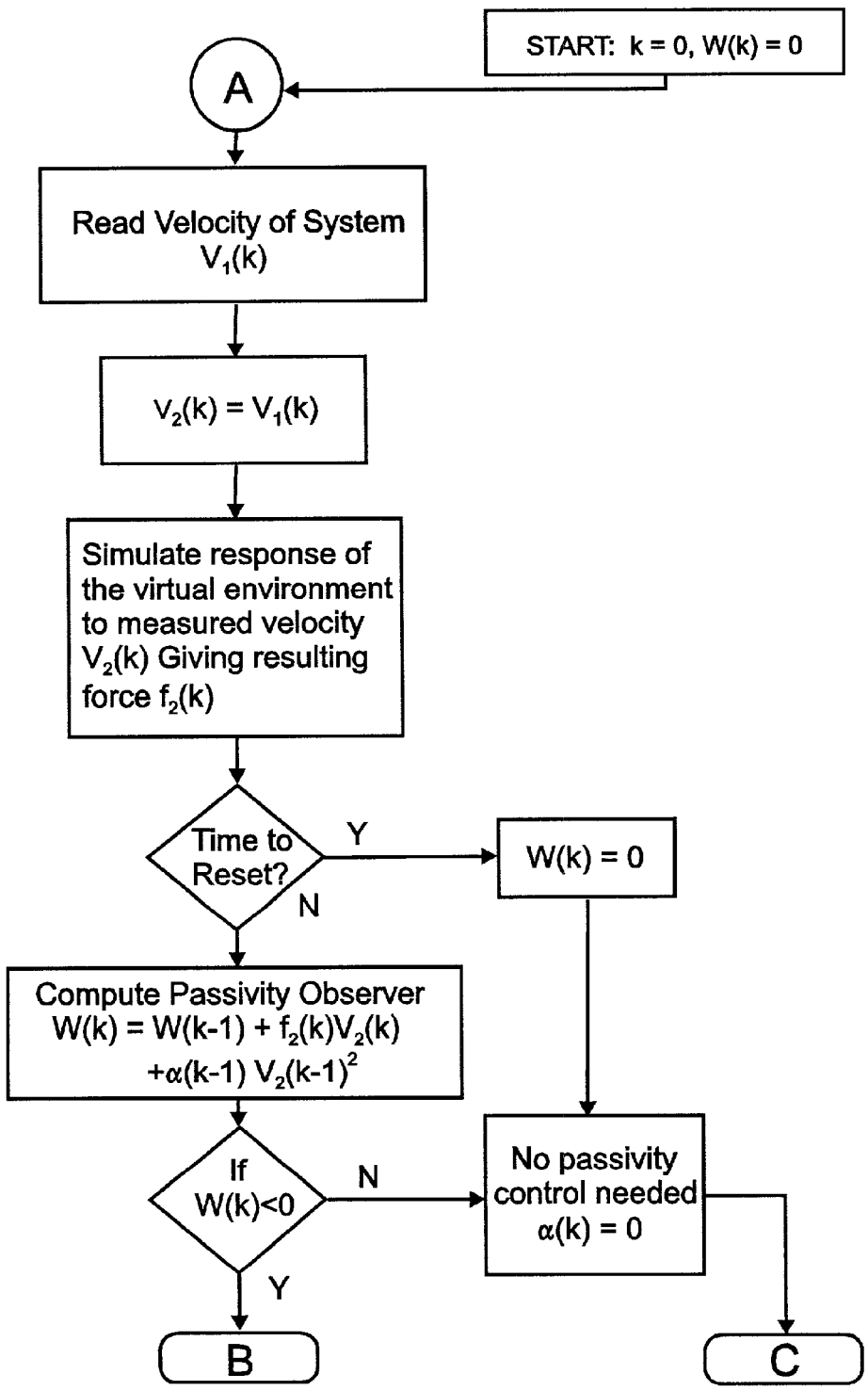
FIG. 1 is a flow chart illustrating the implementation of the method of this invention in one-port systems (e.g., a human interacting with a virtual environment) for impedance causality and admittance causality, respectively.
Figure 1B:
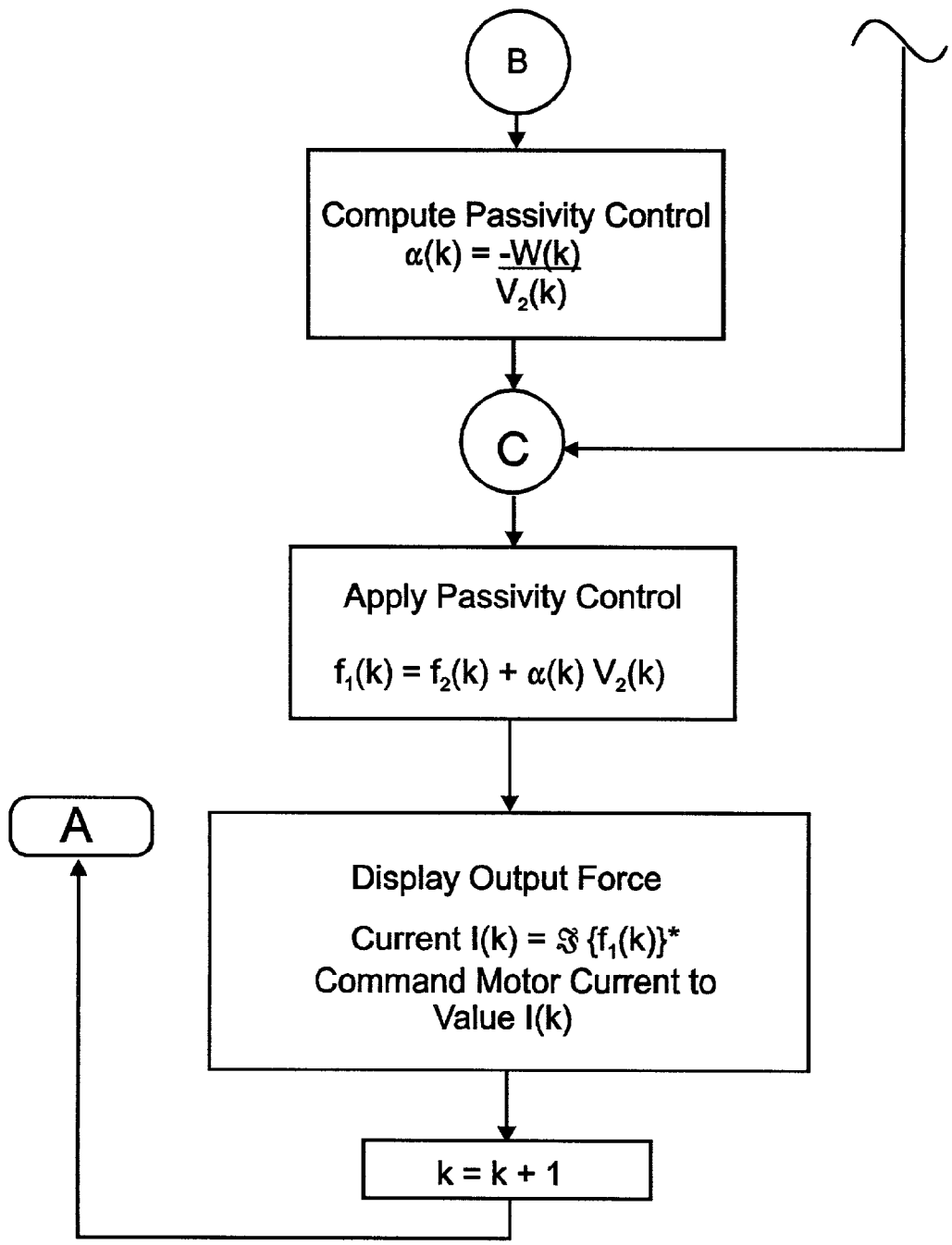
Figure 2A:
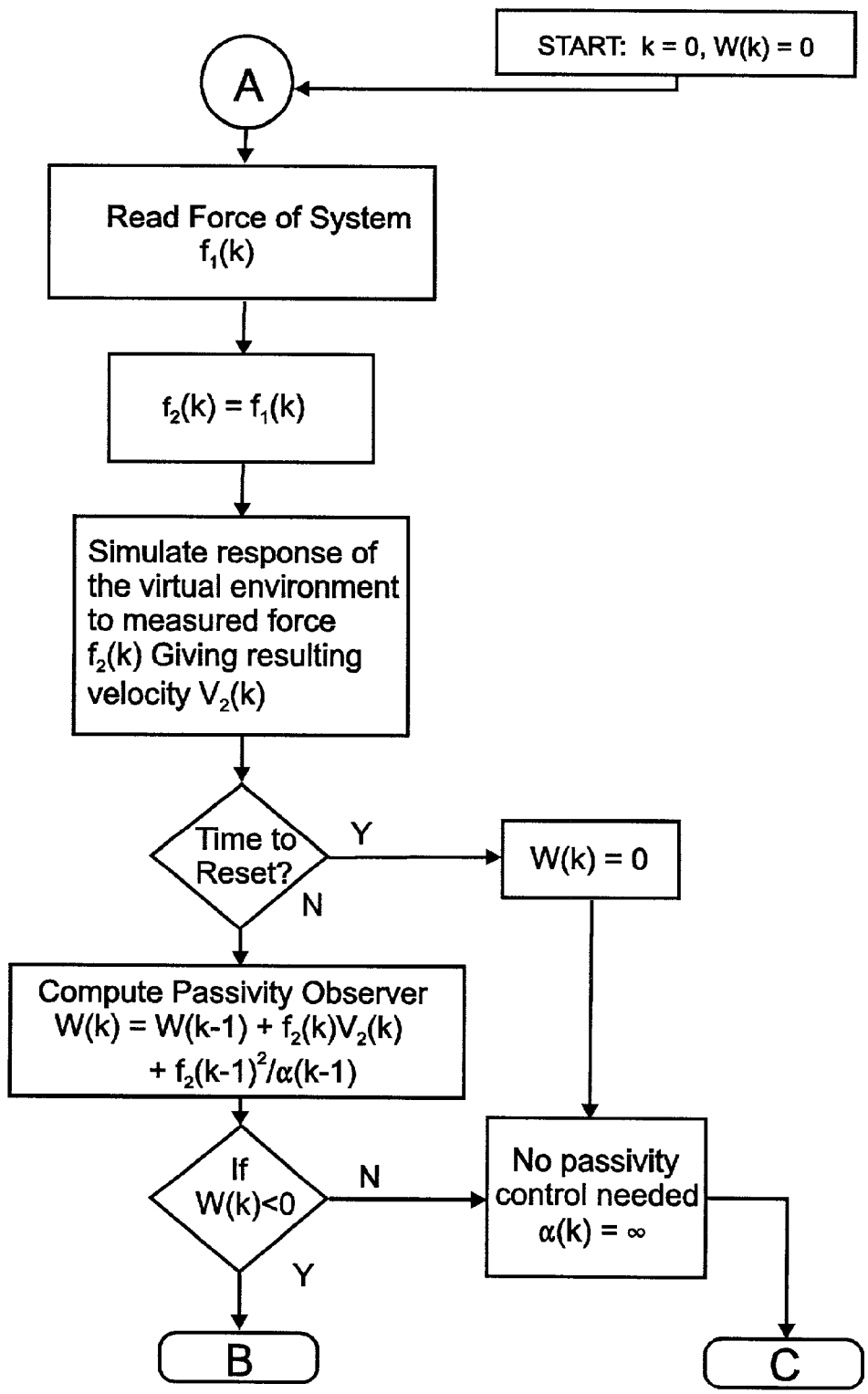
FIG. 2 is a flow chart illustrating the implementation of the method of this invention in a one-port system for admittance causality.
Figure 2B:
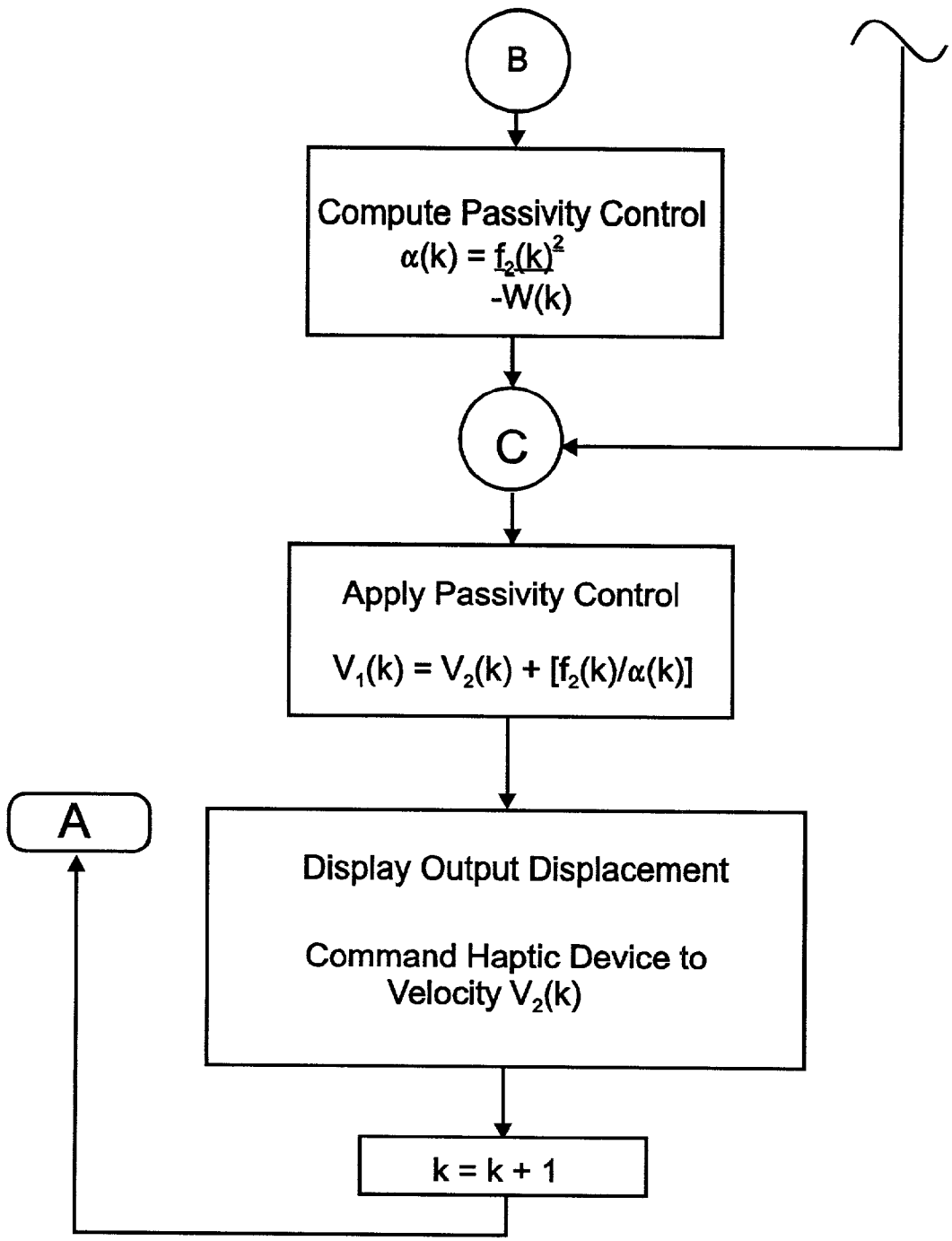

FIGS. 1 and 2 are flow charts illustrating the implementation of the method of this invention in one-port systems (e.g., a human interacting with a virtual environment) for impedance causality and admittance causality, respectively. Note that in the flow charts the indices n and k of the equations herein are converted to k (for k=1 to n) for simplicity. All of the quantities in the schemes may be vectors for use in multiple motion axes or for multiple degrees of freedom. The steps illustrated in these flowcharts are readily implemented using conventional programming methods for a variety of applications of haptic interfaces.

The invention is illustrated using a three degree-of-freedom Cartesian manipulator designed to act as a haptic interface to virtual or remote environments as described in U.S. Pat. No. 6,046,563, to Moreyra, M. R. for "Haptic Device," incorporated herein by reference. Brushless motors provide control forces through a steel cable transmission along three mutually orthogonal translational axes. The gantry-type configuration produces a very stiff structure and a workspace that is free of kinematic singularities. Motors for each axis are mounted on the grounded base. Since all motor masses lie outside the transmission system, much larger actuators can be used, providing very high force output. The device is capable of rendering peak forces of up to 200 N and continuous forces of up to 100 N in each axis over the workspace of 300×300×200 mm$^3$. The user grasps a handle mounted on the end effector which is capable of moving an x, y and z directions.

This is a virtual building block simulation in which the user can select and manipulate individual, or a group of simulated Lego® blocks. Haptic feedback prevents one block from impeding on another and also renders the interaction forces when blocks are "snapped" together. The simulation provides a simple but very compelling example of how the addition of force feedback can dramatically increase the user's sense of immersion in a virtual reality system.

In FIG. 1, for purposes of illustration, at the start point A, at time equals zero (k=0) power also is 0. The scheme shows an interactive process, being repeated many (e.g. 1000) times per second at time increments k=1 . . . n. Optical position encoders in the shaft of the handle as described in U.S. Pat. No. 6,046,563, which generate a pulse when the user moves the position of the shaft an increment, send information on the position of the handle from which velocity of the handle at time k, $V_1(k)$, is computed in the processor. The expression $V_2(k)=V_1(k)$ is provided to make the notation consistent in FIGS. 1 and 2. The processor then simulates the response of the virtual environment to the measured velocity $V_2(k)$, calculating the force $f_2(k)$ which was exerted by the user on the handle. This determines the power $f_2(k)V_2(k)$ which should be exerted against a virtual object in the virtual environment, and therefore also the power which would ordinarily (in prior art systems) be exerted against the handle by the virtual environment.

The improvement of this invention provides a means for increasing the stability of the system (minimizing the sense of vibration the user feels when force exerted by the user encounters an object in the virtual environment) and for making the virtual environment more quickly responsive to force exerted by the user in terms, i.e. quicker to exert a corresponding force back against the handle so that the user feels he has encountered a solid object.

In this invention, the processor applies a damping power $\alpha$ to the power being applied back to the user through the handle when the virtual environment would otherwise be exerting power toward the user which causes vibration or "bounce." Unless the processor receives a signal indicating it is time to reset the "passivity observer," this damping power will be applied. The "Passivity Observer" is computed to determine if the virtual environment is generating energy or absorbing energy by integrating the power in the virtual environment and in the variable damping element $\alpha[W(k)=W(k-1)+f_2(k)V_2(k)+f_2(k10)^2/\alpha(k-1)]$. If the virtual environment is giving out more power than has been put into it, i.e. is generating power, i.e. if $W(k)<0$, then a Passivity Control is applied. The Passivity Control (amount of damping power $\alpha$ to be used) is computed as shown in B of FIG. 1 [$\alpha(k)=-W(k)/V_2(k)$]. At C of FIG. 1, the Passivity Control is then applied to calculate the amount of force $f_1(k)$ to be applied against the handle [$f_1(k)=f_2(k)+\alpha(k)V_2(k)$]. In response to this calculation, the system then produces and "displays" (i.e. applies) a modification to the current, such that the current I(k) is equal to $\Im\{f_1(k)\}$ (exemplified for application with an electric motor), which causes the motor to exert the right amount of power against the user to compensate for vibration.

If the Passivity Observer shows that W(k) is not less than zero, i.e. that the virtual environment is absorbing energy at that moment, then no damping power $\alpha$ is required ($\alpha(k)=0$). Step B of FIG. 1 can then be skipped, and at step C, since $\alpha(k)=0$, $f_1(k)=f_2(k)+0$, no damping power is applied.

W(k) can become very much greater than zero. When the user, i.e., a virtual object representing the user, encounters a hard object in virtual reality, he/she would appear to bounce away from it. With each bounce, W(k) would go down, but the response time of the system would be reduced. If the system were not reset, it would take numerous bounces for W(k) to return to zero. Thus this invention provides a routine to reset (between bounces) the Passivity Observer when the Passivity Observer is positive for too long, so that the Passivity Controller will start to work sooner. Thus reduces the amount of vibration or "buzz" the user feels when encountering a hard object in the virtual environment.

To determine if it is time to reset the Passivity Observer, a heuristic rule is applied, which depends on the particular system parameters, to reset the Passivity Observer to zero so that faster stable contact can be achieved with smaller bounces. In one embodiment of this invention, the rule states that if the absolute value of the force in the system is less than a certain value $\epsilon$ for a certain period of time $\tau$ seconds ($\epsilon$ and $\tau$ being experimentally determined in accordance with the teachings herein), then the Passivity Observer is reset to zero.

The PC begins to operate when the PO detects active behavior from the system. This means that if the PO has a "build-up" of dissipated energy, then the PC does not work until all "built-up" energy is dissipated. For example, consider the case of a virtual environment which may interact extensively with a very dissipative object. In this case, the PO will accumulate a large positive value. A second case occurs locally, when non-linear behavior of the environment can cause dissipative behavior closely followed by active behavior. In both cases, if the energy accumulated in the PO can be reset to zero properly, then the faster stable contact can be achieved with smaller bounces. With this motivation, we derive a heuristic rule, called "resetting" on the detection of free motion state or other criteria. The rule is as follows: If |f|<ε for τ sec, then reset the PO to zero, where, we call ε the force threshold, and τ the duration. The idea is that this rule can detect free motion and that problems of active behavior do not persist from one contact state to the next. Thus it might be appropriate to reset the PO in between contacts with virtual surfaces.

Without the PC, operation is highly unstable after the user makes contact with the virtual environment as shown in FIG. 13. The PC does not begin to operate until all the energy in the PO is dissipated. In contrast, with zero initial value the PC begins to operate sooner after contact and the contact transient is smaller. Experiments with a wide variety of force thresholds and durations were performed to find values for correct detection of the free regime. The force threshold is expressed as a fraction of the maximum force output of the device and the duration as multiples of the sampling time T. See Table 1. In free motion, f=0 by constraint of the virtual environment. When $10^7 \times F_{MAX}$ was chosen for the force threshold and τ was 1×T or 100×T, a very sluggish feeling in free motion was found: the resetting was continuous and the PC was operating all the time. Next, when a big value $(10^{-1} \times F_{MAX})$ was chosen as the force threshold with τ=100× T, no resetting occurred even during the contact: the PC could not operate and instability was not prevented. Second, assume the extremely short case that the duration equals the sampling time (1×T sec, ε=$10^{-1} \times F_{MAX}$). With such a short duration, resetting is being done when even a single noisy signal is less than the force threshold, as the PC operates too much. Finally, ε=0.2N, ($10^{-3} \times F_{MAX}$)τ=0.01 sec (10×T) were found to be useful values for the resetting.

TABLE 1

Guideline for Choosing ε and τ

| τ | $10^{-7} \times F_{MAX}$** | $10^{-3} \times F_{MAX}$ | $10^{-1} \times F_{MAX}$ |
|---|---|---|---|
| 1 × T* | viscous feeling and PC on in free motion | * * * | too much resetting |
| 10 × T | * * * | good performance | * * * |
| 100 × T | viscous feeling and PC on in free motion | * * * | no resetting |

*T = 1 msec
**$F_{MAX}$ = 200 N
***Means no experiment.

The flow-chart of FIG. 1 is based on impedance causality, and assumes that force is proportional to the current applied to the motor. In larger systems, e.g. involving moving parts such as robot arms with a high degree of friction, some of the force will be dissipated before it reaches the human user. Thus, force must be sensed when it arrives at the human operator. Such a system is shown in FIG. 2. In FIG. 2, the velocities of the human and robot $V_1(k)$ and $V_3(k)$ respectively, are read in the first step. The system of FIG. 2 is otherwise analogous to that described above with reference to FIG. 1.

Hybrid admittance-impedance systems may also be constructed without undue experimentation, depending on system parameters, as will be appreciated by those of skill in the art.

Figure 3A:
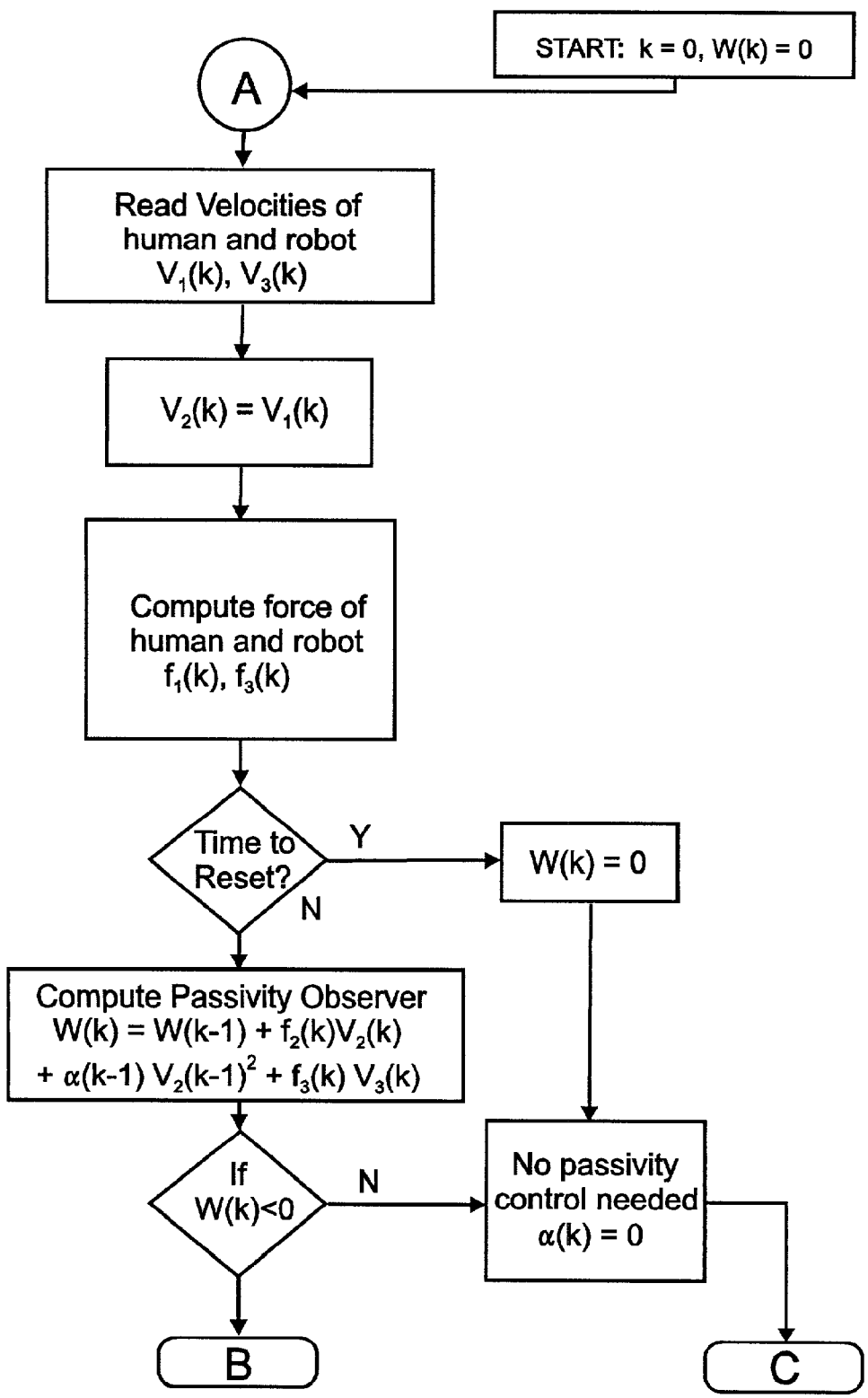
FIG. 3 is a flowchart illustrating the implementation of the method of this invention in a two-port application, i.e., applications to teleoperators and remote control robots with force feedback, for impedance causality.
Figure 3B:
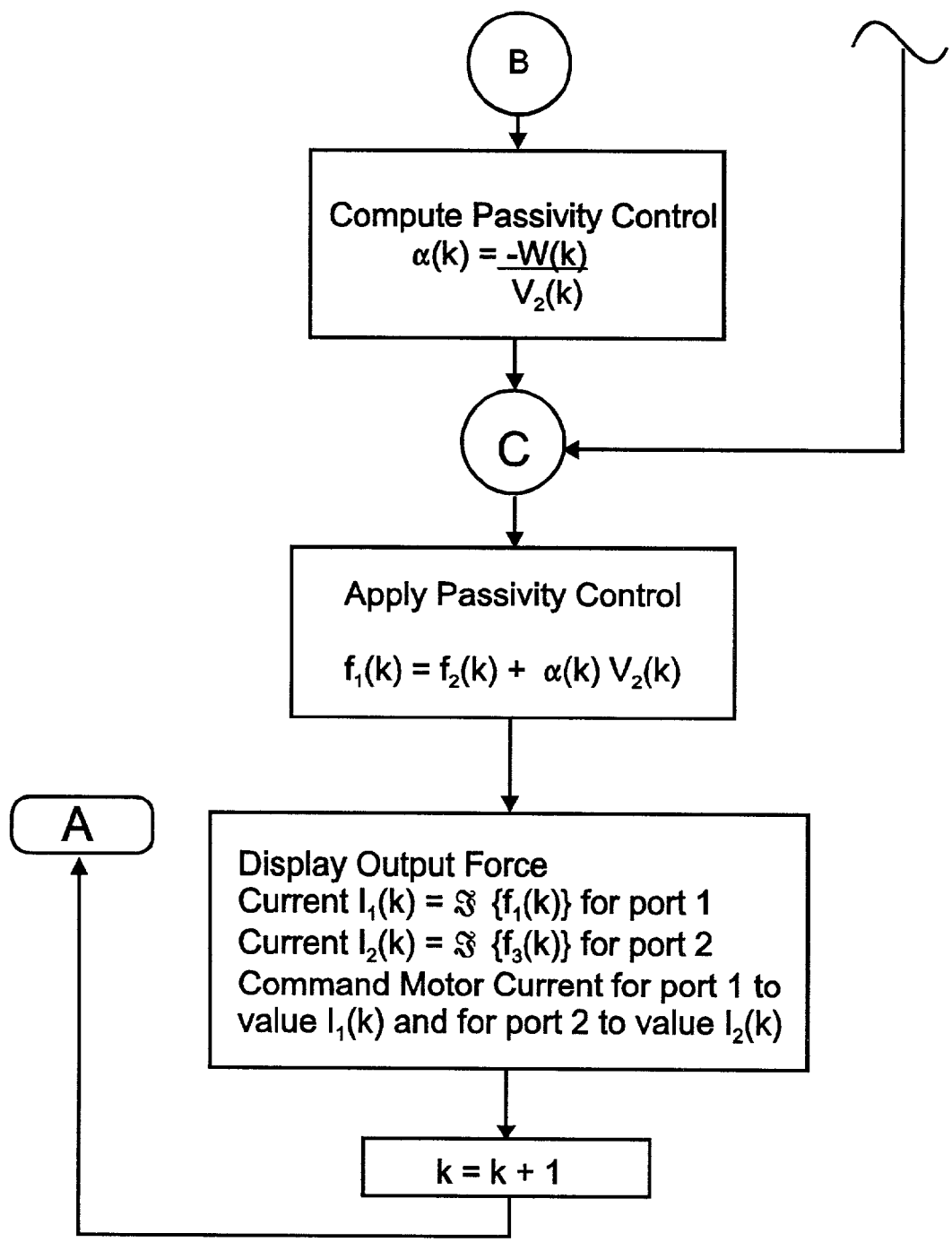
Figure 4A:
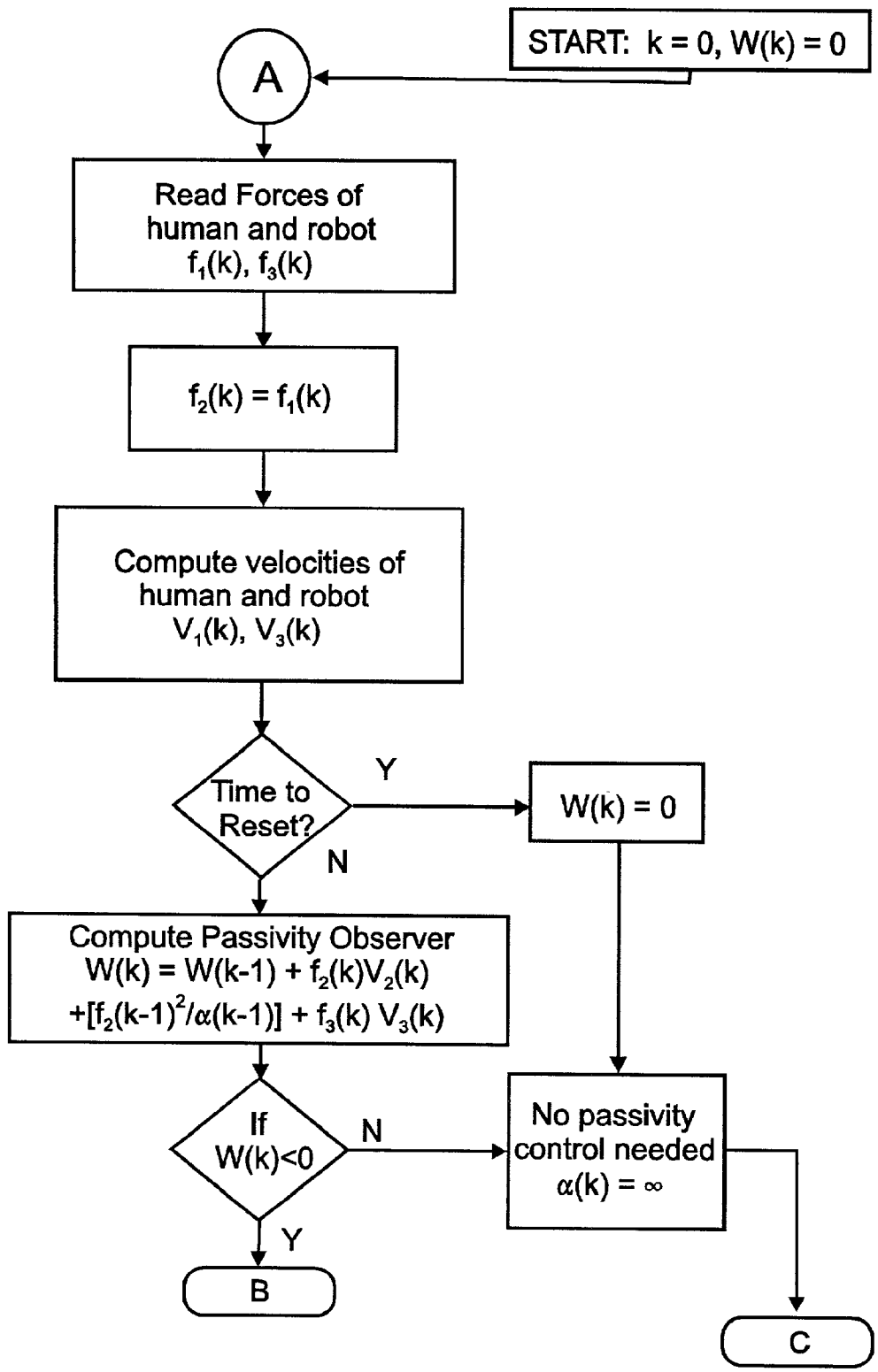
FIG. 4 is a flow chart illustrating implementation of the method of this invention in a two-port application for admittance causality.
Figure 4B:
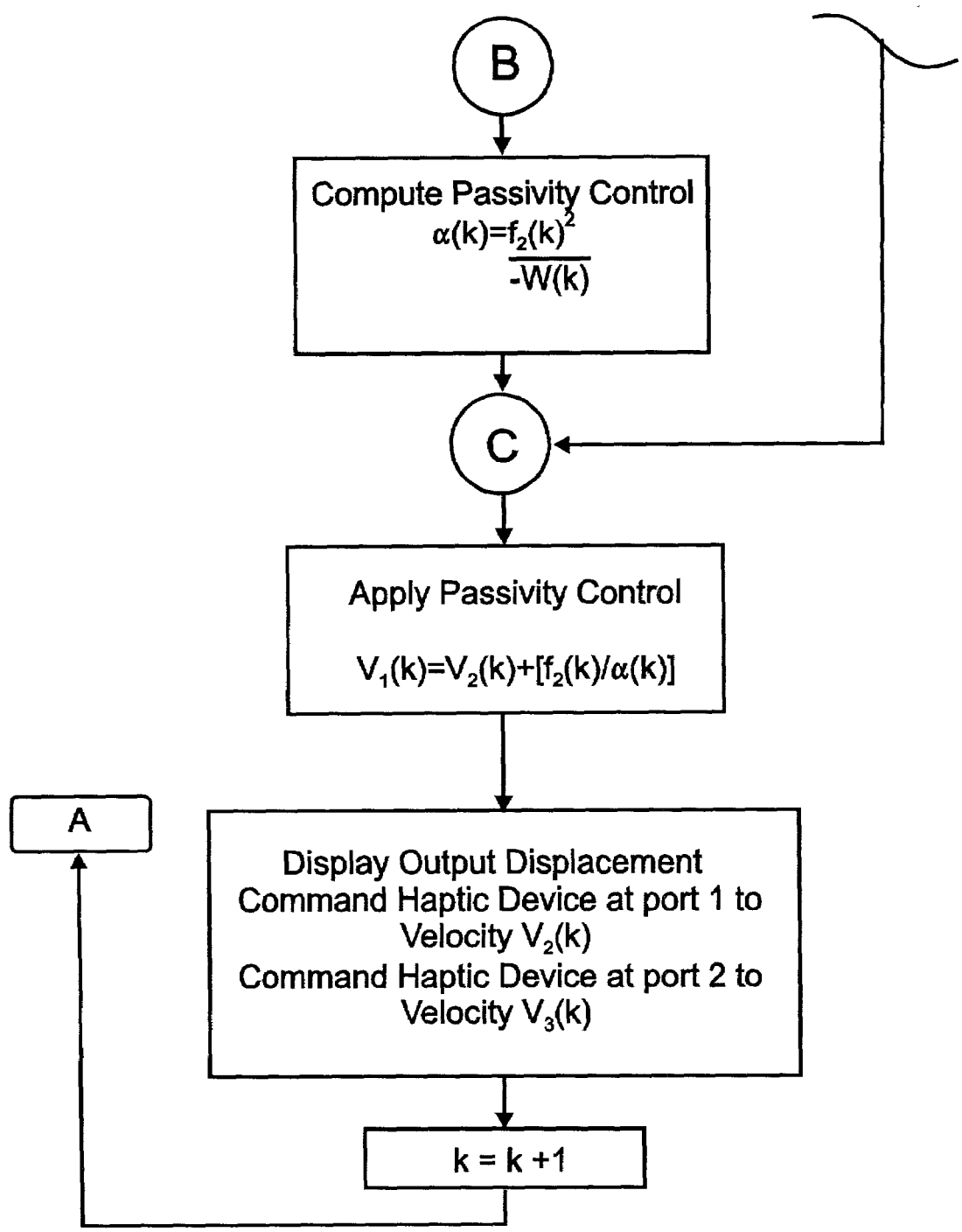

FIG. 3 is a flowchart illustrating the implementation of the method of this invention in a two-port application, i.e., applications to teleoperators and remote control robots with force feedback, for impedance causality. The method is implemented for admittance causality as illustrated in FIG. 4. The methods of this invention can be implemented in multi-port system applications in a manner analogous to FIGS. 3 and 4. Note that a single multi-port system can include ports that are impedance-based and/or ports that are admittance-based. Impedance-based ports are implemented as illustrated in FIG. 3 and admittance-based ports are implemented as illustrated in FIG. 4.

Definitions

Figures 5A, 5B:
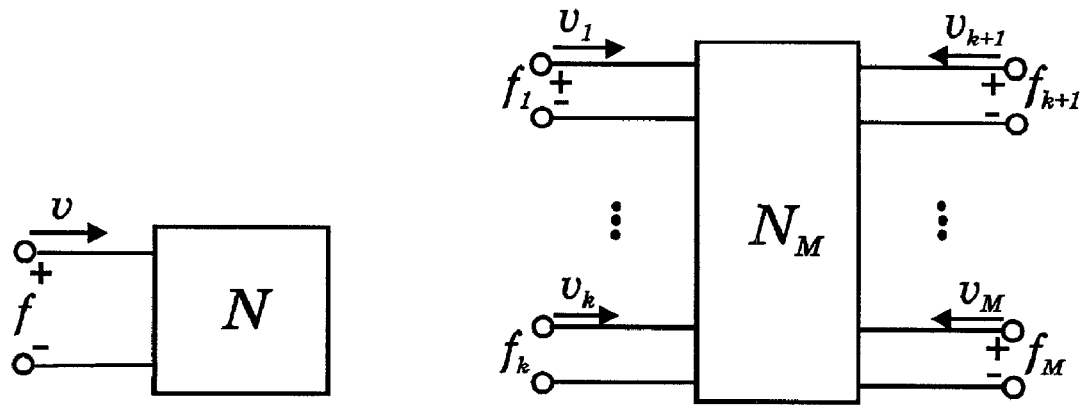
FIG. 5 shows one-port and M-port networks representing components of a haptic interface system.

The sign convention for all forces and velocities is defined so that their product is positive when power enters the system port (FIG. 5). We assume that the system has initial stored energy at τ=0 of E(0).

We then use the following widely known definitions of passivity.

Definition 1: The one-port network, N, with initial energy storage E(0) is passive if and only if, $$\int_0^t f(\tau)v(\tau)d\tau + E(0) \geq 0, \forall t \geq 0 \quad (1)$$

for admissible force (f) and velocity (v). Equation (1) states that the energy supplied to a passive network must be greater than negative E(0) for all time (van der Schaft, A. J., "L2-Gain and Passivity Techniques in Nonlinear Control," Springer, Communications and Control Engineering Series, 2000; Adams, R. J. and Hannaford, B.,"Stable Haptic Interaction with Virtual Environments," IEEE Trans. Robot. Automat., vol. 15(3):465–474, 1999; Desoer, C. A. and Vidyasagar, M., Feedback Systems: Input-Output Properties, New York: Academic, 1975; Willems, J. C., "Dissipative Dynamical Systems, Part I: General Theory," Arch. Rat. Mech. An., 45: 321–351, 1972).

Definition 2: The M-port network, $N_M$, with initial energy storage E(0) is passive if and only if, $$\int_0^t (f_1(\tau)v_1(\tau) + \cdots + f_M(\tau)v_M(\tau))d\tau + E(0) \geq 0, \forall t \geq 0 \quad (2)$$

for all admissible forces ($f_1, \ldots, f_M$) and velocities ($v_1, \ldots, v_M$).

The elements of a typical haptic interface system include the virtual environment, the virtual coupling network, the haptic device controller, the haptic device, and the human operator. Many of the input and output variables of these elements of haptic interface systems can be measured by the computer and (1) and (2) can be computed in real time by appropriate software. This software is very simple in principle because at each time step, (1) or (2) can be evaluated with few mathematical operations.

A. Passivity Observer

The conjugate variables which define power flow in such a computer system are discrete-time values. We confine our analysis to systems having sampling rates substantially faster than the dynamics of the haptic device, human operator, and virtual environment so that the change in force and velocity with each sample is small. Many haptic interface systems (including our own) have sampling rates of 1000 Hz, more than ten times the highest significant mode in our system. Thus, we can easily "instrument" one or more blocks in the system with the following "Passivity Observer," (PO)

$$E_{obsv}(n) = \Delta T \sum_{k=0}^{n} f(k)v(k) \qquad (3)$$

Where $\Delta T$ is the sampling period. For an M-port network with zero initial energy storage.

$$E_{obsv}(n) = \Delta T \sum_{k=0}^{n} [f_1(k)v_1(k) + \cdots + f_M(k)v_M(k)] \qquad (4)$$

If $E_{obsv}(n) \geq 0$ for every n, this means the system dissipates energy. If there is an instance that $E_{obsv}(n)<0$, this means the system generates energy and the amount of generated energy is $-E_{obsv}(n)$. When there are multiple interconnected elements, we observe each one separately in order to determine which ones are active and which are passive.

Figure 6:
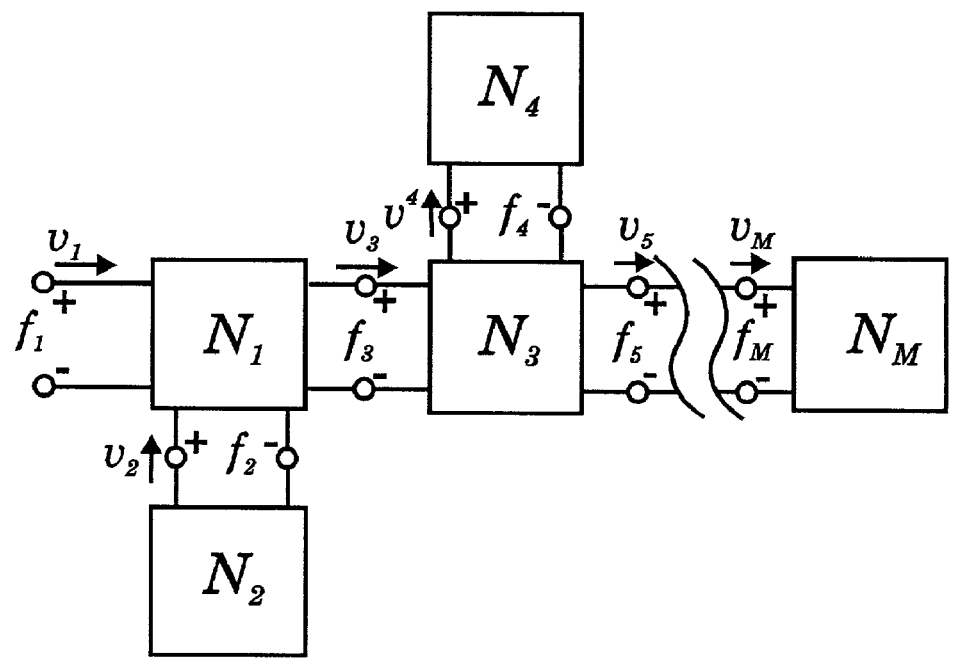
FIG. 6 shows an example of arbitrarily connected network system with one open end. Each block can be either passive or active. Entire system passivity is the sum of individual blocks.

Example: Let us consider a network of arbitrarily connected N-port elements as shown in FIG. 6. If we define a Passivity Observer for each element, and assume zero initial stored energy:

$$E_{N_1}(n) = \Delta T \sum_{k=0}^{n} [f_1(k)v_1(k) + f_2(k)v_2(k) - f_3(k)v_3(k)] \qquad (5)$$

$$E_{N_2}(n) = -\Delta T \sum_{k=0}^{n} f_2(k)v_2(k) \qquad (6)$$

$$E_{N_3}(n) = \Delta T \sum_{k=0}^{n} [f_3(k)v_3(k) - f_4(k)v_4(k) - f_5(k)v_5(k)] \qquad (7)$$

$$E_{N_4}(n) = \Delta T \sum_{k=0}^{n} f_4(k)v_4(k) \qquad (8)$$

$$E_{N_M}(n) = \Delta T \sum_{k=0}^{n} f_M(k)v_M(k). \qquad (9)$$

Total energy $E_{obsv}(n) = E_{N_1}(n) + E_{N_2}(n) + E_{N_3}(n) + E_{N_4}(n) + \ldots + E_{N_M}(n)$ (10)

The total energy (Eq. 10) determines whether or not the entire network is passive or active. If each of the individual energies is substituted into Eq. 10 we get the interesting result:

$$E_{obsv}(n) = \Delta T \sum_{k=0}^{n} f_1(k)v_1(k) \qquad (11)$$

In the previous example we have left one port unconnected and the Passivity Observer for the network reduced to Eq. 11 which depends only on $f_1 v_1$. There are three ways that this network can be terminated: 1) open circuit ($v_1=0$), 2) short circuit ($f_1=0$) and 3) a one-port network ($f_1 v_1 \neq 0$). In all three cases, if we add in a Passivity Observer for the last element, the total energy becomes zero for all possible networks. This is a consequence of Tellegen's theorem (Chua, L. O. et al., "Linear and Nonlinear Circuits," McGraw-Hill, New York, 1987). When we have one port undefined as we have in (11), we are observing the behavior of part of a system, in particular, how much energy flows in or out.

We will refer to a port as "open-ended" when it is connected as in "(3)" above, but the analysis stops at that point. We then can restate the definition of passivity in the context of an M-port system with multiple subcomponents.

Theorem 1: For any arbitrarily connected network system with P open ends, the amount of dissipated or generated energy can be calculated using input and output values of the open-ended port(s) such as:

$$E_{obsv}(n) = \Delta T \sum_{k=0}^{n} [f_1(k)v_1(k) + \cdots + f_P(k)v_P(k)] \qquad (12)$$

and if $E_{obsv}(n) \geq 0$ for every n, this system dissipates energy; else if there is an instance that $E_{obsv}(n)<0$, this system generates energy and the amount of generated energy is $-E_{obsv}(n)$.

B. Passivity Controller

Consider a one-port system which may be active. Depending on operating conditions and the specifics of the one-port element's dynamics, the Passivity Observer may or may not be negative at a particular time. However, if it is negative at any time, we know that the one-port may then be contributing to instability. Moreover, we know the exact amount of energy generated and we can design a time varying element to dissipate only the required amount of energy. We will call this element a "Passivity Controller" (PC).

The Passivity Controller takes the form of a dissipative element in a series or parallel configuration (FIG. 7). Both obey the constitutive equation:

$$f = \alpha v \qquad (13)$$

Figure 7A:
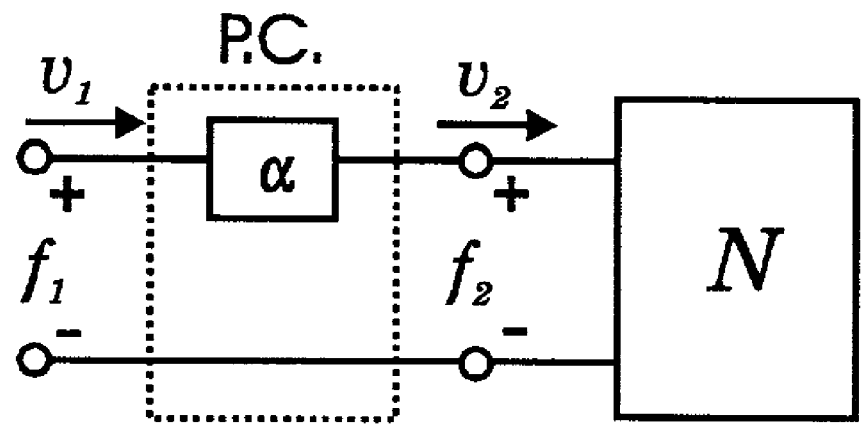
FIG. 7 shows series (a) and parallel (b) configurations of Passivity Controller for one-port networks. α is an adjustable damping element. Choice of configuration depends on input/output causality of model underlying the one-port.
Figure 7B:
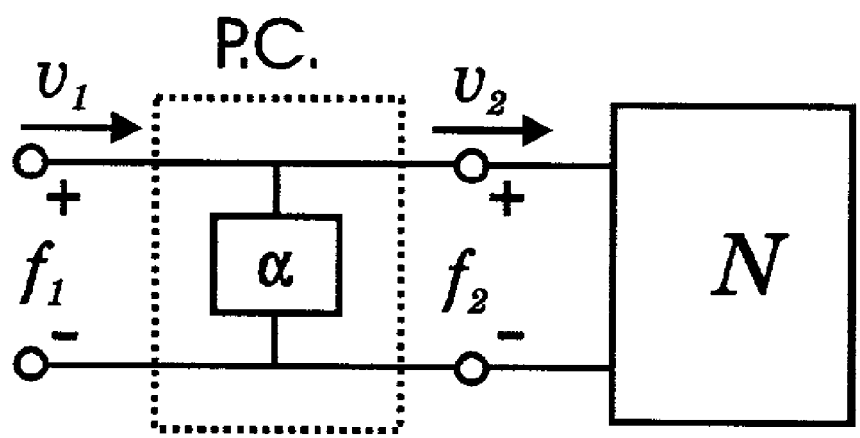

Specifically, for the series connection (FIG. 7a)

$$f_1 = f_2 + \alpha v \qquad (14)$$

and for the parallel case (FIG. 7B)

$$v_2 = v_1 - \frac{f_1}{\alpha} \qquad (15)$$

For a series PC with impedance causality, we compute $\alpha$ in real time as follows:
1) $v_1(n) = v_2(n)$ is an input;
2) $f_2(n) = F_{VE}(v_2(n))$
   where $F_{VE}(\ )$ is the output of the virtual environment.
3) $E_{obsv}(n) = E_{obsv}(n-1) + [f_2(n)v_2(n) + \alpha(n-1)v_2(n-1)^2]\Delta T$ $$4) \quad \alpha(n) = \begin{cases} -E_{obsv}(n)/\Delta T v_2(n)^2 & \text{if } E_{obsv}(n) < 0 \\ 0 & E_{obsv}(n) \geq 0 \end{cases} \qquad (16)$$

5) $f_1(n) = f_2(n) + \alpha(n)v_2(n) \Rightarrow$ output.

Note that ΔT can be canceled from equations (3) and (4) for brevity and to reduce computation. Thus, we can also express the PO as:

$$W(n) = \sum_{k=0}^{n} f_2(k)v_2(k) + \sum_{k=0}^{n-1} \alpha(k)v_2(k)^2 \quad (17)$$

Where $$W(n) = \frac{1}{\Delta T} E_{obsv}(n)$$

We can easily demonstrate that the system computed by (16) is passive:

$$\sum_{k=0}^{n} f_1(k)v_1(k) = \sum_{k=0}^{n} f_2(k)v_2(k) + \sum_{k=0}^{n} \alpha(k)v_2(k)^2 \quad (18)$$

$$\sum_{k=0}^{n} f_1(k)v_1(k) = \quad (19)$$

$$\sum_{k=0}^{n} f_2(k)v_2(k) + \sum_{k=0}^{n-1} \alpha(k)v_2(k)^2 + a(n)v_2(n)^2$$

$$= W(n) + \alpha(n)v(n)^2$$

using (16), $$\sum_{k=0}^{n} f_1(k)v_1(k) \geq 0 \; \forall \; n$$

We can similarly derive the case of admittance causality with a parallel PC.
1) $f_1(n) = f_2(n)$ is an input;
2) $v_2(n) = V_{VE}(f_2(n))$
   where $V_{VE}()$ is the admittance of the virtual environment.

$$3)\; W(n) = W(n-1) + f_2(n)v_2(n) + \frac{1}{\alpha(n-1)} f_2(n-1)^2$$

$$4)\; \frac{1}{\alpha(n)} = \begin{cases} \dfrac{-W(n)}{f_2(n)^2} & \text{if } W(n) < 0 \\ 0 & W(n) \geq 0 \end{cases} \quad (20)$$

$$5)\; v_1(n) = v_2(n) + \frac{1}{\alpha(n)} f_2(n) \Rightarrow \text{output}.$$

We can also write the PO as:

$$W(n) = \sum_{k=0}^{n} f_2(k)v_2(k) + \sum_{k=0}^{n} \frac{1}{\alpha(k)} f_2(k)^2 \quad (21)$$

Which gives the following passivity proof:

$$\sum_{k=0}^{n} f_1(k)v_1(k) = \sum_{k=0}^{n} f_2(k)v_2(k) + \sum_{k=0}^{n-1} \frac{1}{\alpha(k)} f_2(k)^2 + \frac{1}{\alpha(n)} f_2(n)^2 \quad (22)$$

$$= W(n) + \frac{1}{\alpha(n)} f_2(n)^2$$

using (20), $$\sum_{k=0}^{n} f_1(k)v_1(k) \geq 0 \; \forall \; n$$

The dynamic properties of the device are altered when the operator interacts with a manipulandum. We may have an application in which the load applied to the one-port can be counted on to dissipate energy. For example, the load may be:

$$f_1 = \beta(-v_1) \quad (23)$$

In this case we may wish to replace zero on the RHS of equation (16) or (20) with a negative value such as:

$$\hat{\beta} = \begin{cases} -\beta \sum_{k=0}^{n} v_1(k)^2 & \text{for impedance causality (16)} \\ -\dfrac{1}{\beta} \sum_{k=0}^{n} f_1(k)^2 & \text{for admittance causality (20)} \end{cases} \quad (24)$$

Figure 8A:
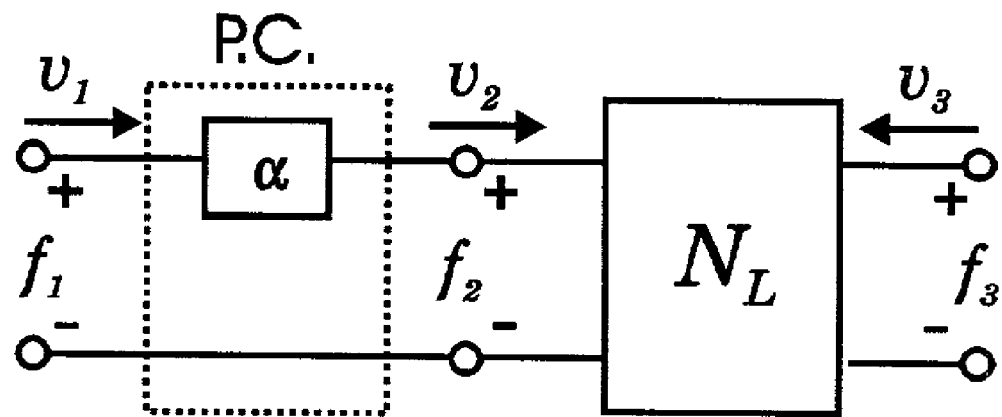
FIG. 8 shows series and parallel Passivity Controllers for two-port networks. A Passivity Controller on only one of the ports is sufficient.
Figure 8B:
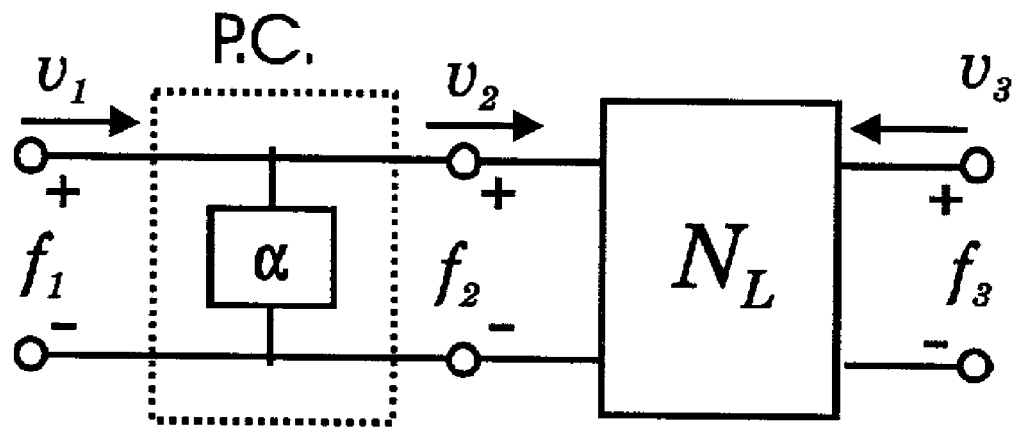

The PC design for the two-port network (FIG. 8) is a straightforward extension of equations 16–20. The PC for the two-port may be placed at either port.

Figure 9A:
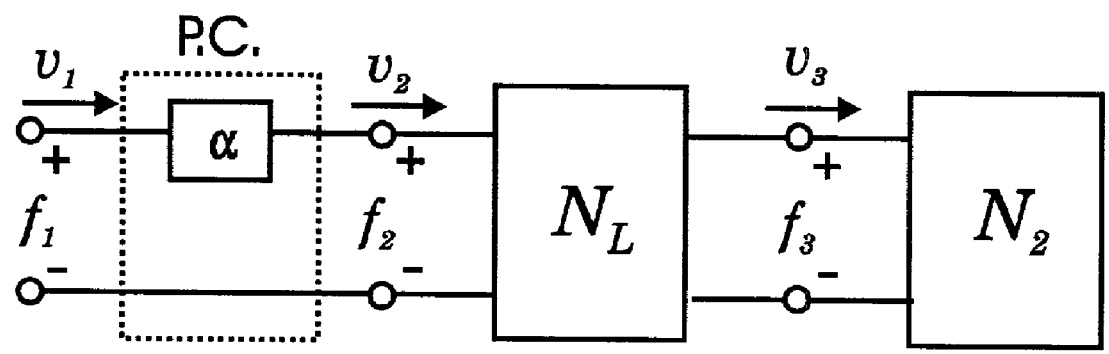
FIG. 9 shows series and parallel Passivity Controllers for network systems.
Figure 9B:
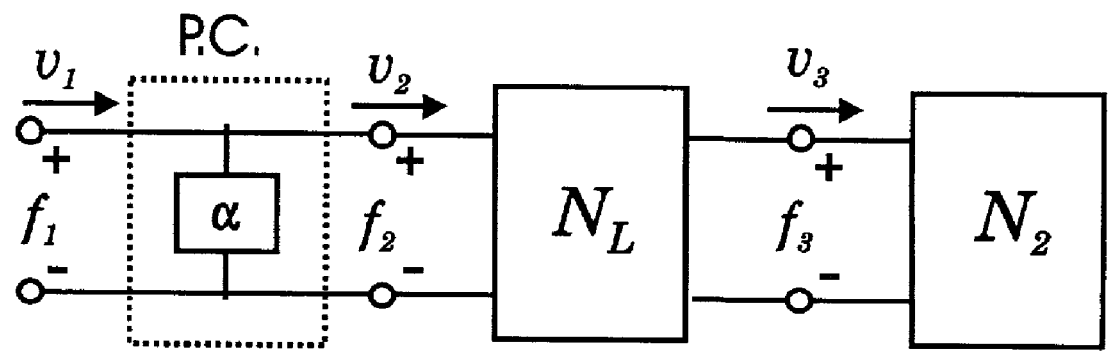

When there are multiple elements (blocks) in a network (such as in FIG. 9) we can add a single PC to regulate energy production of the combined, open-ended system. In general, either velocity or force causality will be determined by the system architecture at the input port. As with the one-port, the causality determines whether a series or shunt PC is used. The PC should be placed at the input port in the selected configuration. Then, the system can be treated exactly as with the one-port element:
  1) Solve the network to obtain the output variable (force for impedance causality, velocity for admittance).
  2) Update the Passivity Observer and compute the Passivity Controller according to Equation 16 or 20.
  3) Compute and return the modified output variable.

We have described two implementations of the Passivity Controller, the series (velocity conserving) and parallel (force conserving) controller.

A problem which may occur with the series Passivity Controller is that the forces required to dissipate the generated energy may exceed the actuator limits. This is especially true if velocity happens to be small. A related problem is that due to the well-known difficulties of computing a noise-free velocity signal, it may be necessary to limit the value of a to avoid "magnifying noise." The magnitude of the force generated by the series Passivity Controller and/or the maximum value of a may be limited as required. In such case, the Passivity Controller may not be able to dissipate all of the energy supplied by a subnetwork in one sample time. The excess energy then must be stored in the system for the next sample time, as discussed in the following Examples.

EXAMPLES

Figure 10:
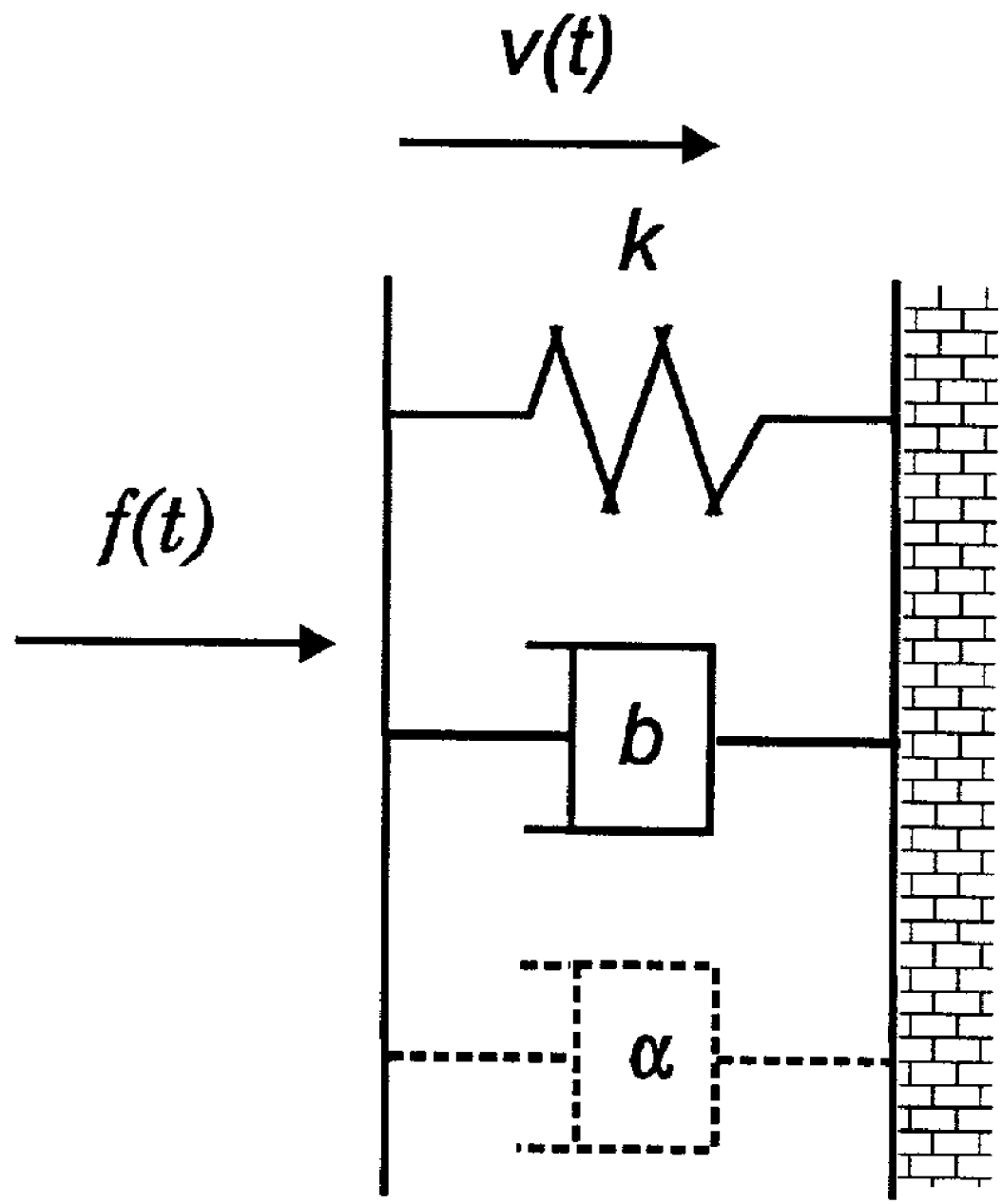
FIG. 10 shows a simple virtual wall model for simulation testing of the Passivity Observer (PO) and Passivity Controller (PC) of this invention.

We illustrate the operation of the Passivity Observer and Passivity Controller with simulation of a simple virtual wall with impedance causality (velocity in, force out). Two separate simulations, one in Matlab/simulink, and one in a C program using trapezoidal integration, were used. The wall consists of a first order, penalty based, spring damper model (FIG. 10) executed at 1000 Hz. We can easily create active behavior of this system by setting the damping parameter, b, to a negative value. The wall generates forces only when x(t)>0. In our simulation, the wall is probed by a point following a sinusoidal velocity trajectory (FIG. 11a). With positive damping (k=710 N/m, b=50 Ns/m, FIG. 11b), the Passivity Observer value increased with time although not monotonically. When the damping parameter is changed to a negative value (b=−50 Ns/m, FIG. 11c) the Passivity Observer returns after each "bounce" to a more negative value, indicating the active behavior of the environment. Finally, with b=−50 Ns/m, and both Passivity Observer and series Passivity Controller (FIG. 11d), the Passivity Observer is constrained to be greater than zero and the amplitude of the bounces stays constant.

Figure 12:
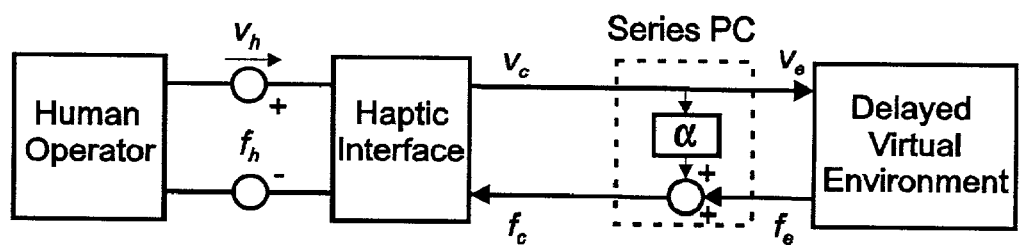
FIG. 12 shows a more detailed simulation model of a complete haptic interface system and Passivity Controller. System blocks are (left to right) human operator, haptic interface, Passivity Controller (α), and virtual environment.
Figure 13A:
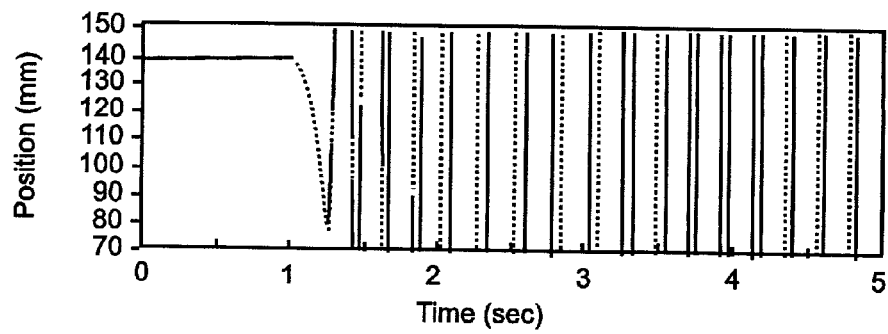
FIG. 13 shows a simulated response of a haptic interface model (FIG. 12). The Passivity Controller is not operating (bottom trace) and the system in unstable.
Figure 13B:
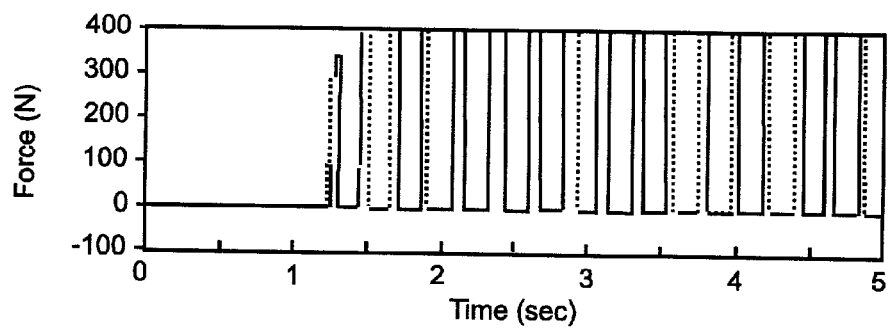
Figure 13C:
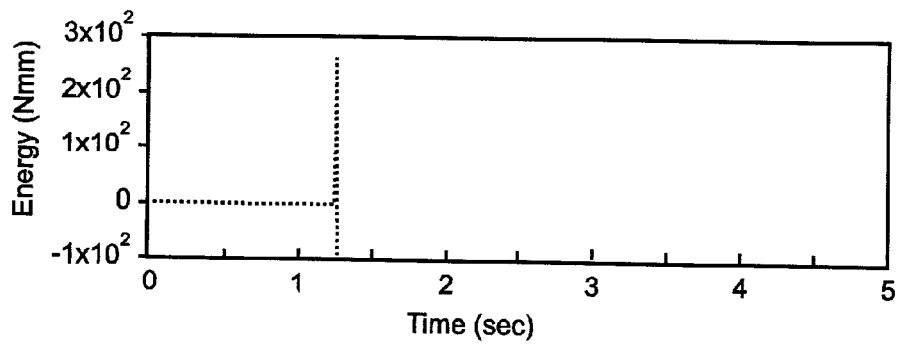
Figure 13D:
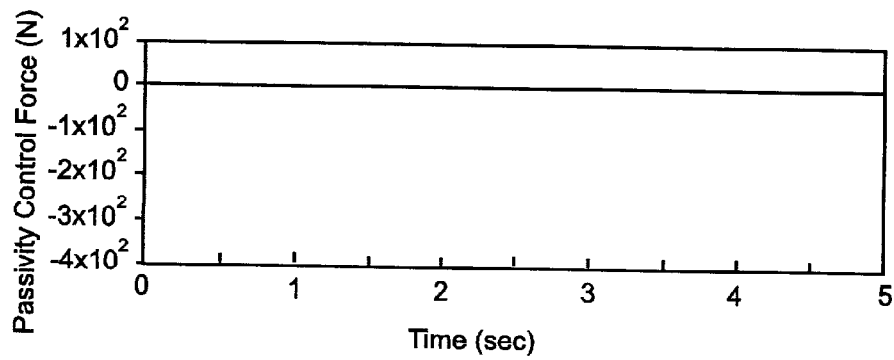
Figure 14A:
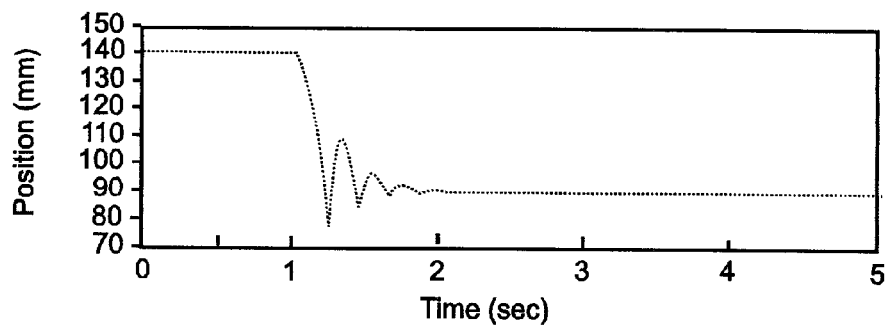
FIG. 14 shows a simulation of a haptic interface system (FIG. 12) with Passivity Controller enabled. The Passivity Controller operates briefly (bottom trace) to damp out oscillations and constrain energy dissipation to be positive.
Figure 14B:
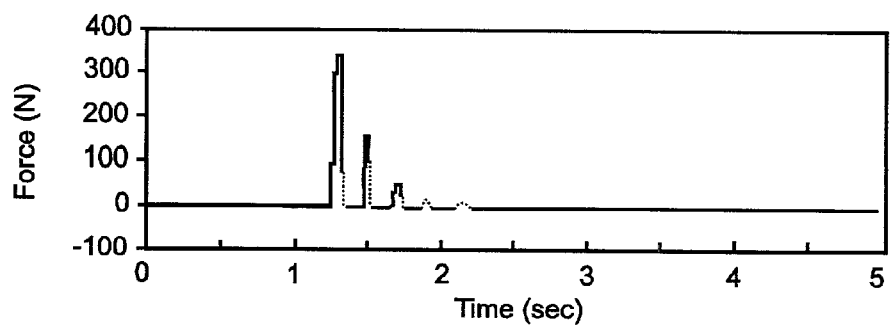
Figure 14C:
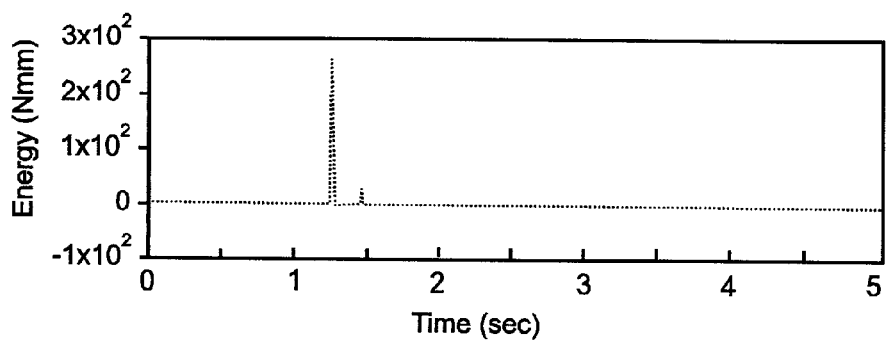
Figure 14D:
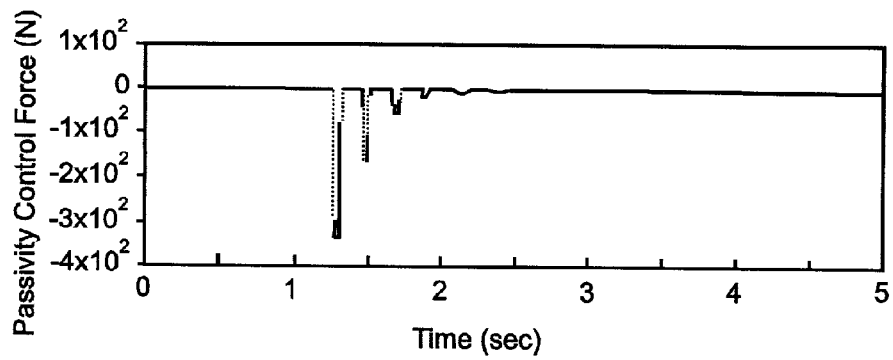

The second simulation is of a basic haptic interface system (FIG. 12) consisting of the human operator (HO), the haptic interface (HI), the Passivity Controller (PC) and the virtual environment (VE). Note that the series Passivity Controller appears in FIG. 12 to be connected in parallel, but this is an artifact of switching to block diagram notation for the connections between the HI, PC, and VE. The VE includes a spring constant of 30 kN/m and operates at a relatively slow sampling rate of 66.67 Hz (15 ms). We set up the Passivity Observer to monitor only the virtual environment and the Passivity Controller. We also assume that the HI has a positive damping value, b. Thus, we do not want to control passivity to zero, but rather to a negative value:

$$\alpha(n) = \begin{cases} \dfrac{\left(W(n) + b\sum_{k=0}^{n} v_e(k)^2\right)}{v_e(n)^2}, & \text{if } W(n) < -b\sum_{k=0}^{n} v_e(k)^2 \\ 0, & \text{if } W(n) \geq -b\sum_{k=0}^{n} v_e(k)^2 \end{cases} \quad (25)$$

where $$W(n) = \sum_{k=0}^{n} f_e(k) v_e(k) + \sum_{k=0}^{n-1} \alpha(k) v_e(k)^2. \quad (26)$$

Without the PC, the system is highly unstable when driven to contact (FIG. 13). With the added PC, the system achieves stable contact after about 3 bounces (FIG. 14), which complete in about 0.5 sec. Note, however, that PC force is about 350 N for the first bounce.

Figure 15:
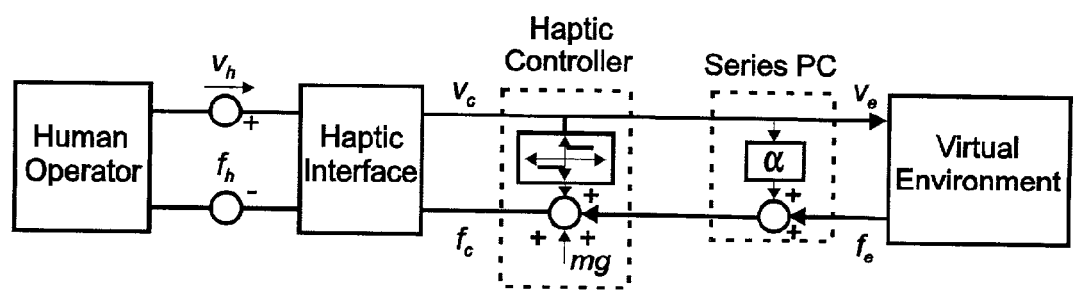
FIG. 15 is a block diagram of an experimental test system. The additional block (center) shows friction and gravity compensation elements.

Finally, we implemented the PO and PC in our "Excalibur" 3-axis, high force output, haptic interface system (Adams, R. J. et al., "Stable Haptic Interaction Using the Excalibur Force Display," *Proc. IEEE Int. Conf. Robot. Automat.*, San Francisco, Calif., 2000; Adams, R. J. and Hannaford, B. "Excalibur, A Three-Axis Force Display," "*ASME Winter Annual Meeting Haptics Symposium*," Nashville, Tenn., November 1999) in the laboratory. This system consists of the following elements (FIG. 15): human operator (HO), Haptic Interface (HI), haptic controller (HC) having feed forward gravity compensation and friction compensation, the Passivity Controller (PC), and the Virtual Environment (VE). This system is entirely synchronous at 1000 Hz. The HI senses position in 0.1 mm increments, and can display up to 200 N force inside a 300×300×200 mm workspace. The force resolution is 9.8 gf. The virtual environment consisted of virtual Lego-like blocks.

A. Contact with High Stiffness

Figure 16A:
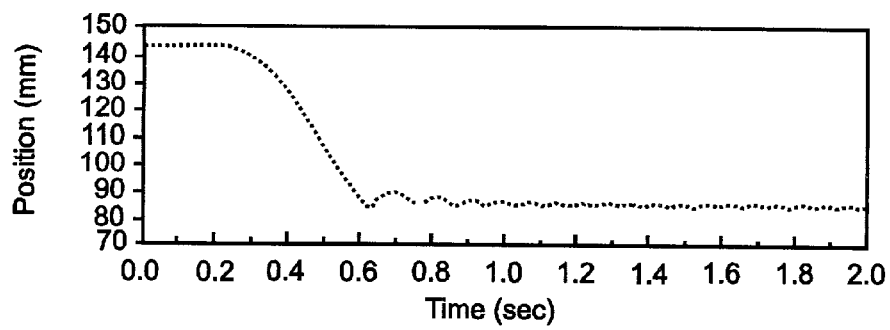
FIG. 16 shows experimental results: on contact with virtual environment (stiffness=90 kN/m), the Passivity Controller is inactive and system exhibits sustained contact oscillations.
Figure 16B:
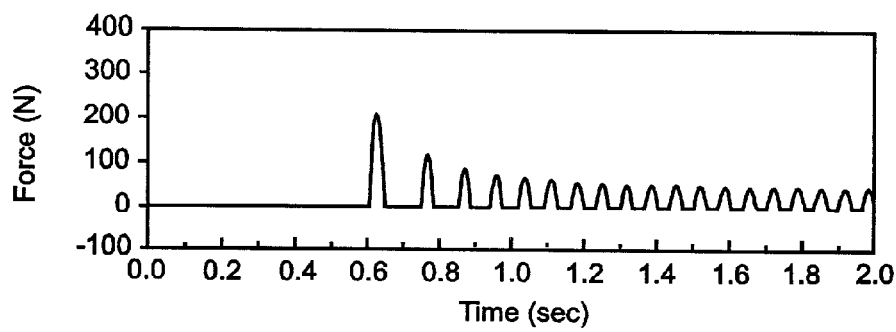
Figure 16C:
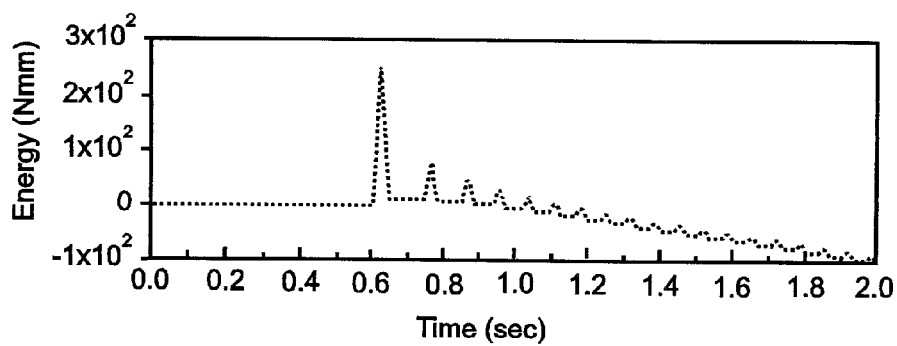
Figure 16D:
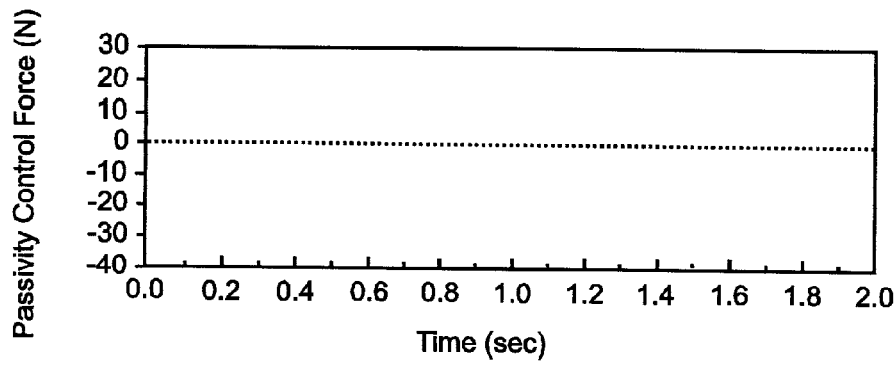

In this experiment, the PO accounted for energy flow in the HC, PC, and VE. We also assumed significant dissipation in the HO and HI (b=35 Ns/m) and so used a non-zero threshold for the PC. In the first experiment, without the PC, the operator approached the virtual object (k=90 kN/m) at about 200 mm/s (FIG. 16a). Contact was unstable, resulting in an oscillation observable as force pulses (FIG. 16b), the Passivity Observer (FIG. 16c) was initially positive, but grew to more and more negative values with each contact. Interestingly, the initial bounce was passive, but the subsequent smaller bounces were active.

Figure 17A:
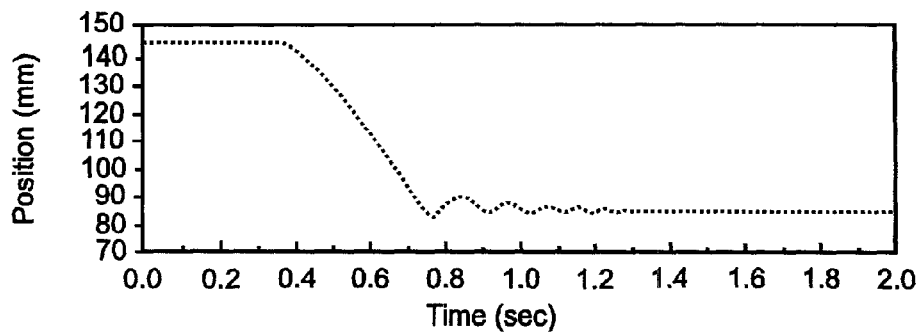
FIG. 17 shows experimental results: on contact with same virtual environment as FIG. 16 with the Passivity Controller operating, oscillation is suppressed by brief pulses of force from PC (bottom trace). Note that initial "bounce" behaved passively, but subsequent smaller bounces were active.
Figure 17B:
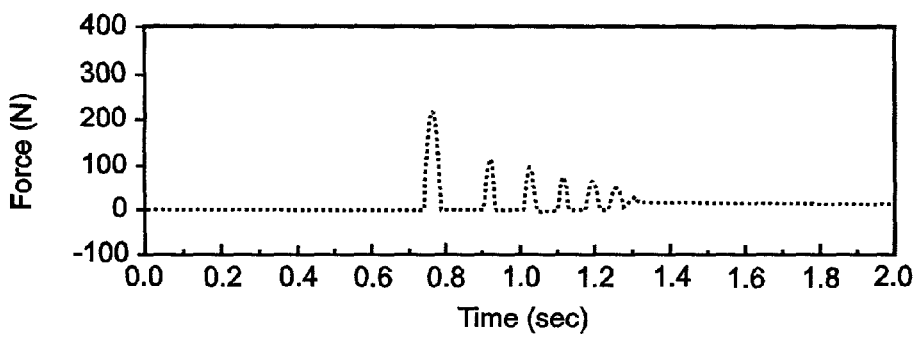
Figure 17C:
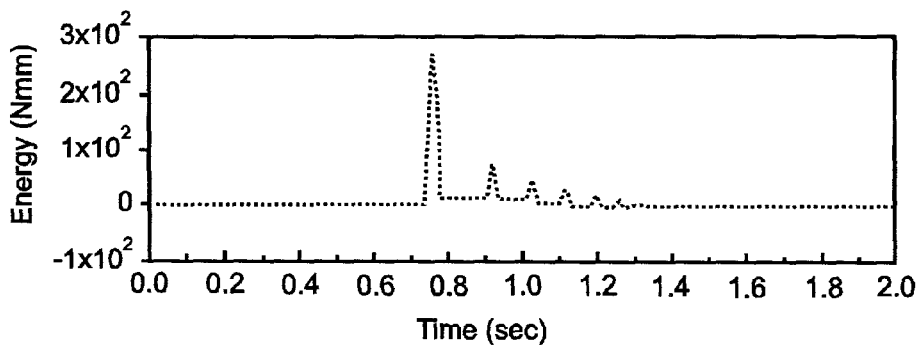
Figure 17D:
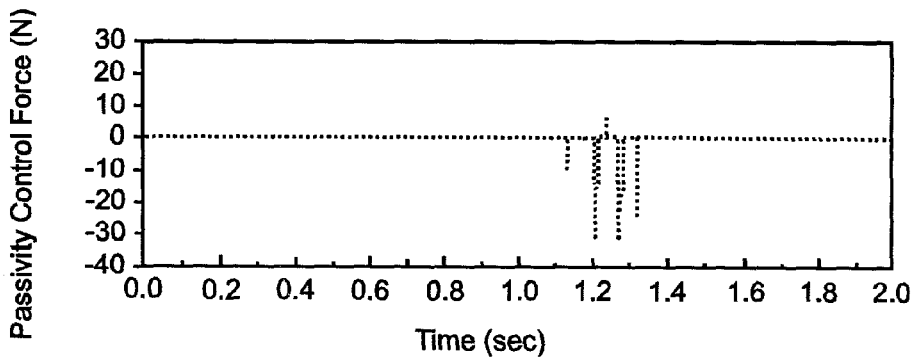

In the second experiment, with the PC turned on, the operator approached contact at the same velocity (FIG. 17a), but stable contact was achieved with about 6 bounces (FIG. 17b). Again, the first bounce can be seen to behave passively, but subsequent smaller bounces were active (FIG. 17c). On the fourth bounce, the PC began to operate (FIG. 17d), and eliminated the oscillation. The PC force was less than 40 N, well within our actuator capabilities. However, in some cases PC force may add to other forces so we cannot tell from this alone whether or not actuator saturation occurred.

B. Control Force Limit

Figure 18A:
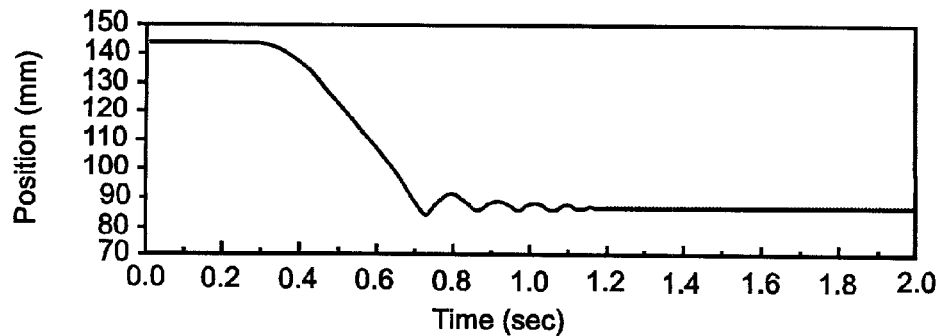
FIG. 18 shows experimental results: same conditions as FIG. 16, but Passivity Controller force limited to ±20 N. The system is stable despite imposing a force limit to represent actuator saturation.
Figure 18B:
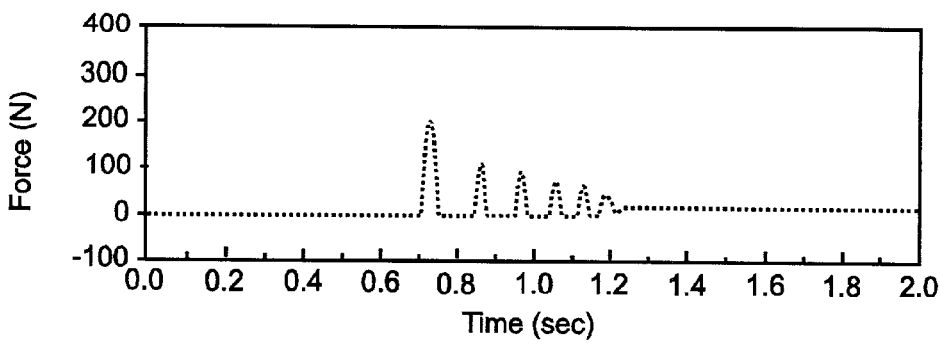
Figure 18C:
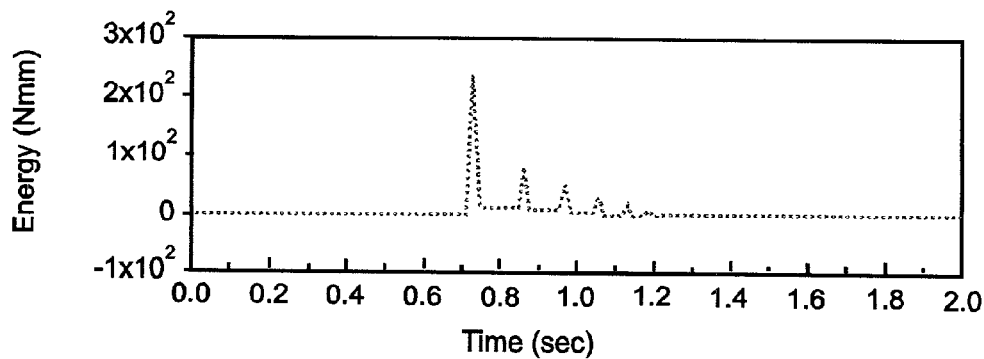
Figure 18D:
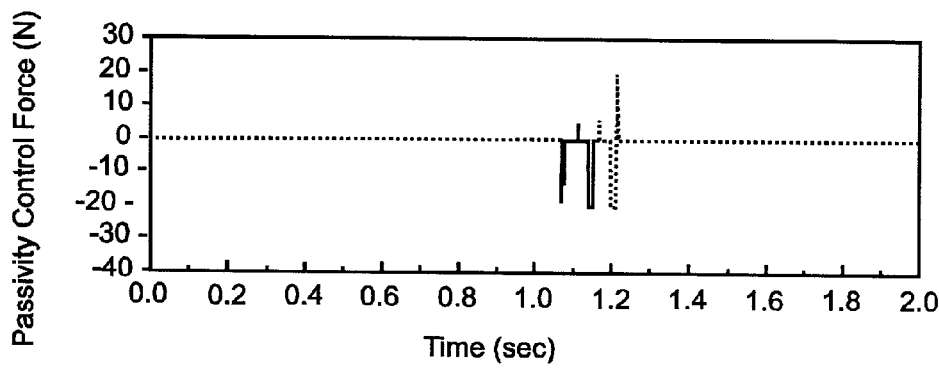
Figure 19A:
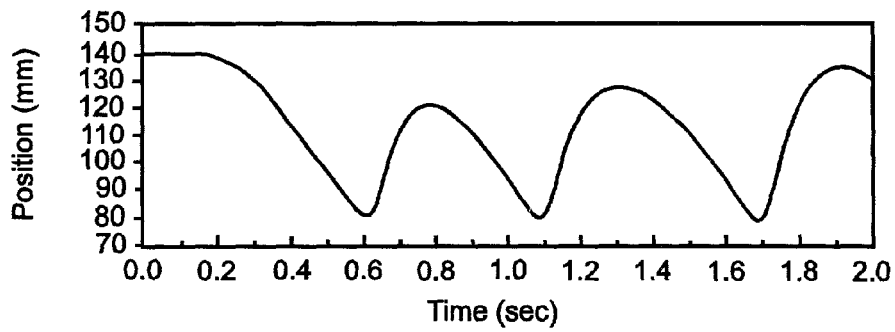
FIG. 19 shows experimental results: stiffness reduced to 30 kN/m, but virtual environment slowed down to 67 Hz instead of 1000 Hz. The Passivity Controller is off and the system is highly unstable.
Figure 19B:
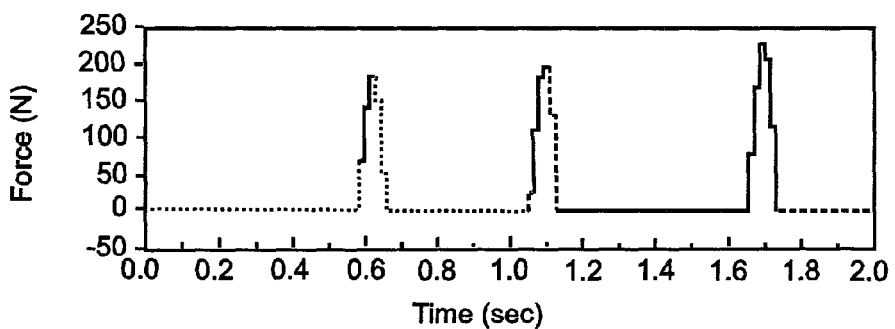
Figure 19C:
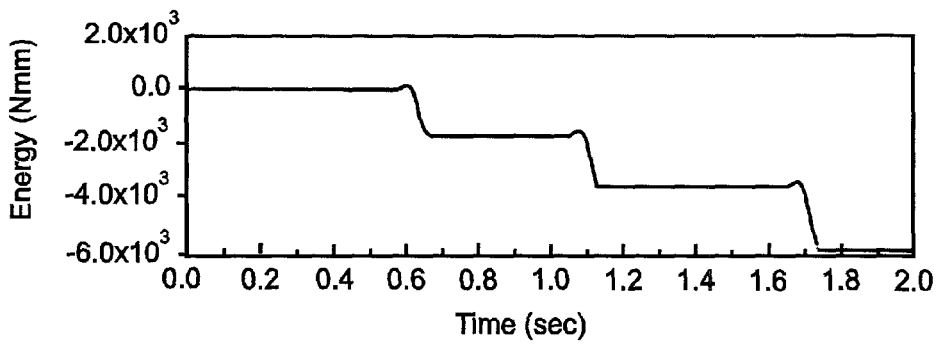
Figure 19D:
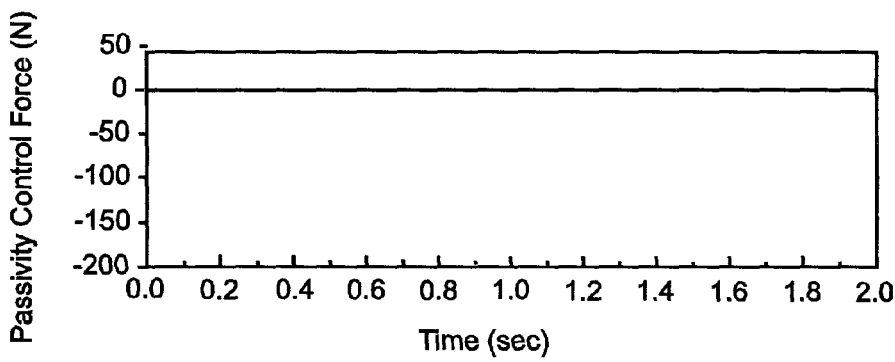
Figure 20A:
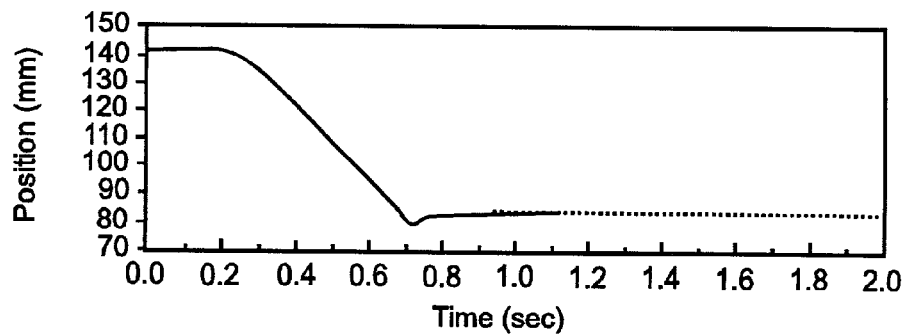
FIG. 20 shows experimental results: same conditions as FIG. 19, but the Passivity Controller is enabled. The system now achieves stable, steady state, contact.
Figure 20B:
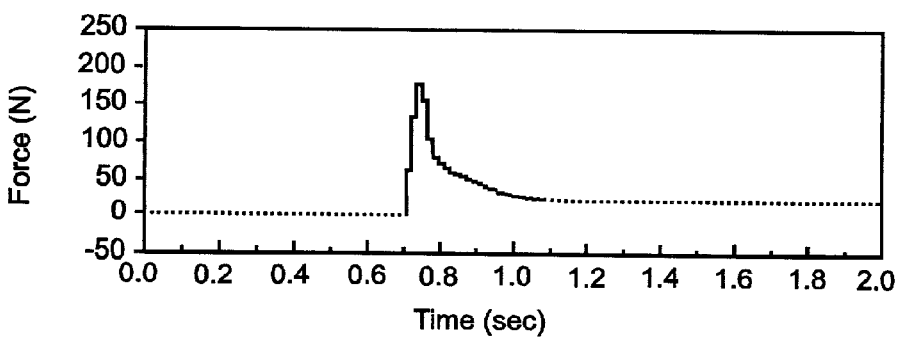
Figure 20C:
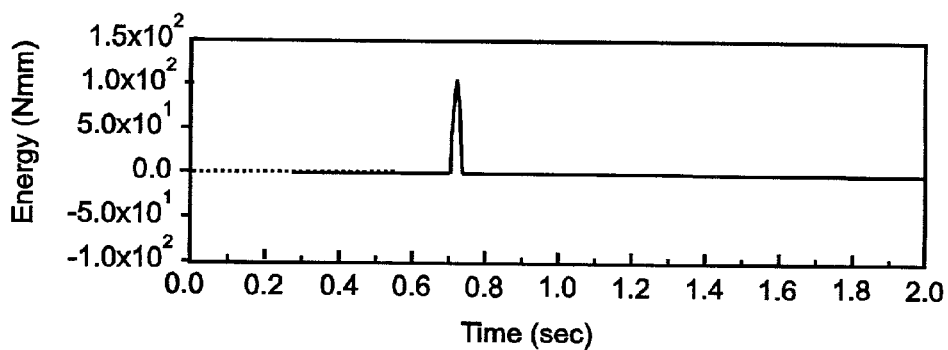
Figure 20D:
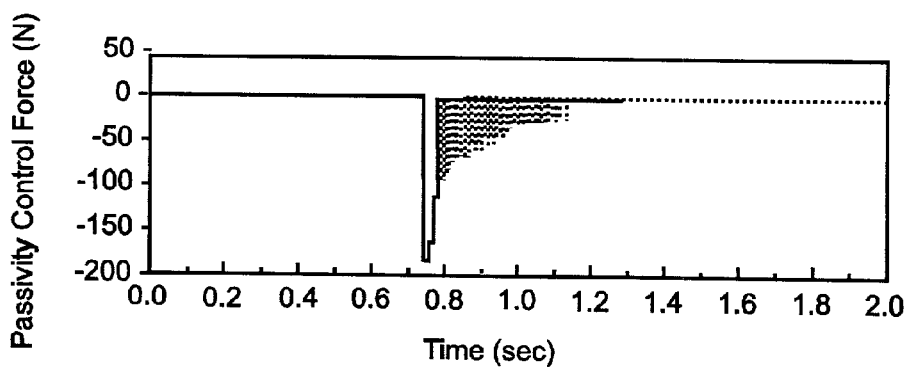

In the next experiment, we study the effect of limiting PC force to ±20 N. The result is almost the same (FIG. 18) with some slightly longer pulses observed in the PC output (FIG. 18d) and some positive forces observed at the end of the PC output.

C. Delayed Environment

One of the most challenging problems for further application of haptics is application to slow computing environments. These slow VEs are characteristic of complex simulations such as deformable objects for surgery or macromolecular dynamics. We modified the basic Excalibur system to artificially slow down the VE to a rate of 66.67 Hz. The output force value of the simulation was held constant for 15 samples and then replaced with the new force value based on its input 15 samples prior. Environment stiffness was set to 30 kN/m.

Without PC, the result is a very unstable system (FIG. 19). The sampling delay due to the slow VE is visible in the shape of the force pulses which are as high as 200 Newtons (FIG. 19b). With PC, the contact was stabilized within a single bounce (FIG. 20). The contact force (FIG. 20b) is limited to a single pulse which tapers exponentially during about one second. The PO (FIG. 20c, note change in scale) consists of a single positive peak and is constrained to positive values. The passivity control output (FIG. 20d) consists of a single large pulse, followed by a noise-like signal during the exponential decay of force (t=0.8 s to 1.2 s).

Discussion

The haptic controller of the Excalibur system contains two features which are illustrated by our analysis. First, the controller compensates for gravity by adding a force in the positive Z direction equal to the weight of the Z-axis moving parts. This force component is constant and independent of the applied velocity, so it could be active or passive depending on the applied velocity. The gravity compensator will be passive over any closed trajectory in Z.

The second component is a Coulomb friction component $$F_c(k) = A\mathrm{sgn}(-v(k)), A>0$$

$$\sum_{k=0}^{n} F_c(k)v(k) = A\sum_{k=0}^{n} v(k)\mathrm{sgn}(-v(k)) \quad (27)$$

$$= -A\sum_{n=1}^{k} |v(k)|$$

$$\sum_{k=0}^{n} F_c(k)v(k) \leq 0 \quad \forall k$$

Clearly the Coulomb friction compensation term is active. Applying PO's at several points around our Excalibur system confirmed this analysis and showed that active behavior observed in FIG. 16 was primarily due to the friction compensation module.

The Passivity Controller has several desirable properties for applications including haptic interface control. The Passivity Observer and Passivity Controller can both be implemented with simple software in existing haptic interface systems. The stability can be proven, yet it is not a fixed parameter design based on a worst case analysis. Thus, to maintain stability, the PC only degrades performance (through the added damping of the Passivity Controller) when it is needed, and only in the amount needed.

Energy storage elements in the system do not have to be modeled, only dissipation. Dissipation in the elements outside the PO needs to be identified for optimum performance. However, the added performance due to modeling external dissipation (i.e., Equation 24) appears to be small. Thus, the PC can be very useful without any parameter estimation at all.

Nevertheless, the method has some limitations which we considered in advance or which became apparent in experimental testing. First, there are important cases in which virtual environments have very different behavior in different locations. Consider an environment which is very dissipative in location X and active in location Y. If the user spends a lot of time interacting at X, the Passivity Observer may build up a large positive value. Then, if the user moves over and interacts with location Y, the Passivity Controller will not operate until a corresponding amount of active behavior is observed. Theoretically, this is not a problem since even though the interaction may act unstable initially, the amount of instability will be bounded by the accumulated dissipation. Nevertheless, as a practical matter, the amount of active behavior observed may exceed what is desired. Thus, this invention includes a "resetting" method in which we derive heuristic rules for resetting the Passivity Observer to zero. These rules, for example, detect a free motion state. Such heuristics may be experimentally determined in a wide variety of virtual environments.

Additional issues we described and tested were the performance of the system with limits imposed on the Passivity Controller and sensitivity to low values of velocity.

During periods of low velocity (series) or low force (parallel), a hybrid form of PC which includes both series and parallel dissipative elements and selects the most appropriate one for the operating conditions may be used.

The dissipation constant ($\beta$ in Equation 24) for the human operator and haptic interface mechanism may be automatically estimated during operation.

Velocity Threshold

Any control system has well-known difficulties in computing a noise-free velocity signal from digital position measurements. Often these effects are most evident at low velocities. this noise can appear as a force due to the PC dissipation element, $\alpha$: $PC_{Force}=\alpha v$. Noise effect at low velocity can cause noisy behavior of the PC operation by magnifying velocity noise.

One of the more commonly used position sensors in haptic displays is the optical encoder. Encoders are reasonably rugged and easy to interface and are extremely linear and free of dynamics. Unfortunately, the output of an encoder is quantized, and it is well-known that this quantization can lead to limit cycles in digital control systems. Velocity estimates obtained by various differentiation methods are notorious for amplification of high frequency noise.

Some ways to overcome these problems include: slowing down the sample rate, using analog sensors, replacing or using an encoder with higher resolution, and filtering the velocity estimate digitally. The last can be done simply be adding codes to existing devices. One might expect that the cost of filtering would be that the haptic display would become less passive, as in general, filters introduce delay.

The sensor (encoder) resolution used in our haptic interface system is 0.008 mm and the velocity is estimated from the measured positions. By magnifying the interval of interest, we find that there exist some oscillatory fluctuations varying within ±8 mm/s during the contact (FIG. 21c), and this is caused inherently by the quantization in the digital control system:

$$\text{velocity noise} < \pm \frac{\text{sensor resolution}}{\text{sampling rate}} = \frac{0.008 \text{ mm}}{1 \text{ m sec}} = \pm 8 \text{ mm/sec}$$

Figure 21A:
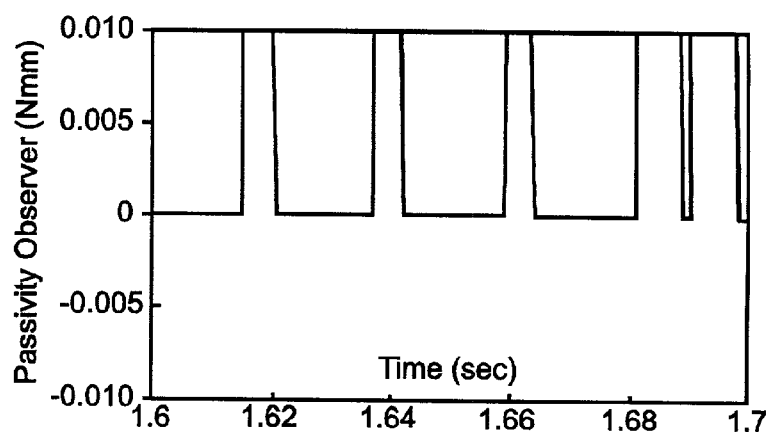
FIG. 21 shows trajectories zoomed in in t=1.6 seconds to 1.7 seconds to show noise effect at low velocity.

Also, we find that each peak of the PC output (FIG. 21b) almost coincides with the noise at low velocity (FIG. 21c), even in $E \geq 0$ where the PC should not operate (FIG. 21a).

Figure 21B:
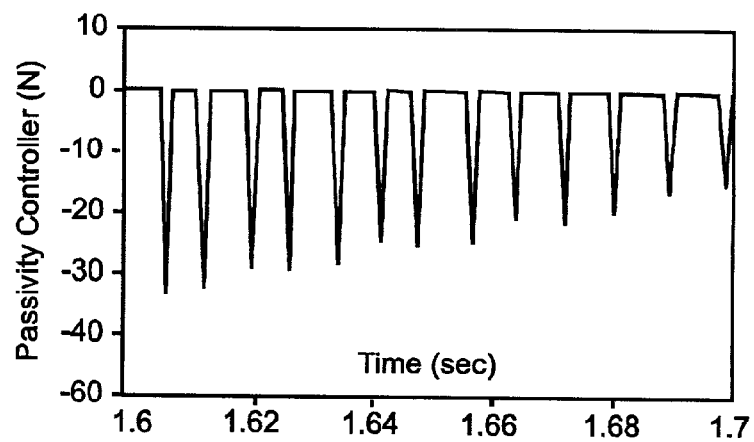
Figure 21C:
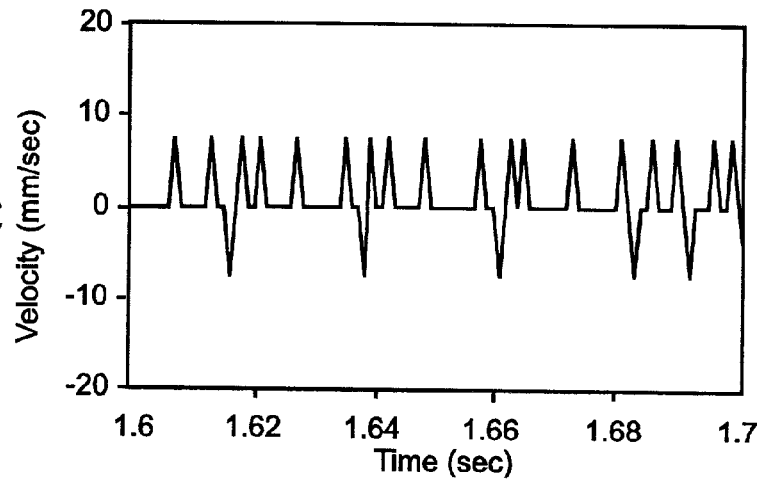

The amplitude of this fluctuation is consistent with the position resolution and sampling time (T=0.001 sec) and can cause perceptible noise in some circumstances (FIG. 21b). Therefore, our approach to avoiding this problem is to introduce a velocity threshold. To eliminate effects of this quantized noise, we applied the following rule for velocity:

$$v(k) = \begin{cases} \hat{v}(k) & \text{if } \|\hat{v}(k)\| > 10 \text{ mm/sec} \\ 0 & \text{else} \end{cases} \quad (28)$$

where, $$\hat{v}(k) = \frac{x(k) - x(k-1)}{\Delta T}$$

and x(k) means the position measured at k.

Figure 22A:
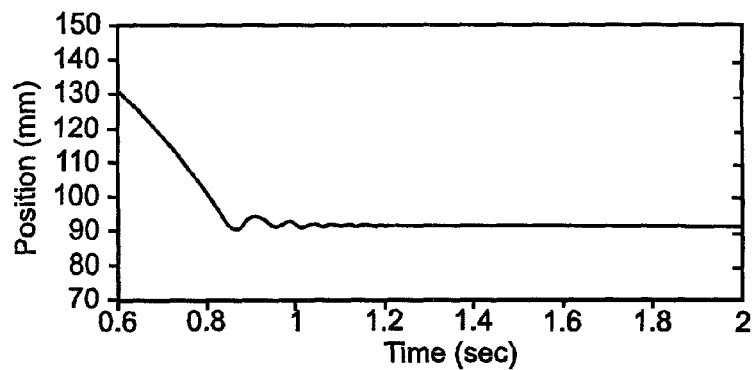
FIG. 22 shows high stiffness with Passivity Control and resetting.
Figure 22B:
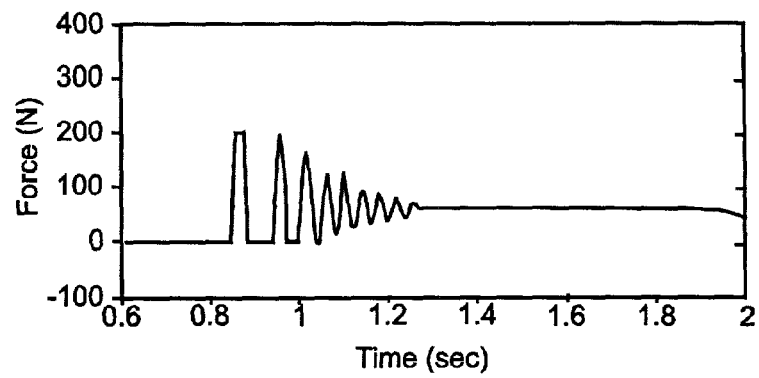
Figure 22C:
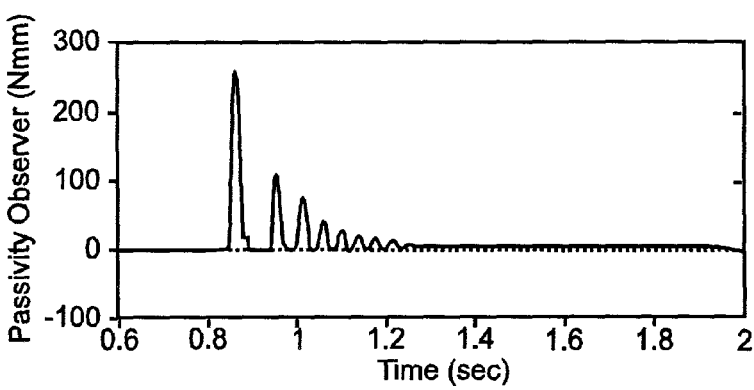
Figure 22D:
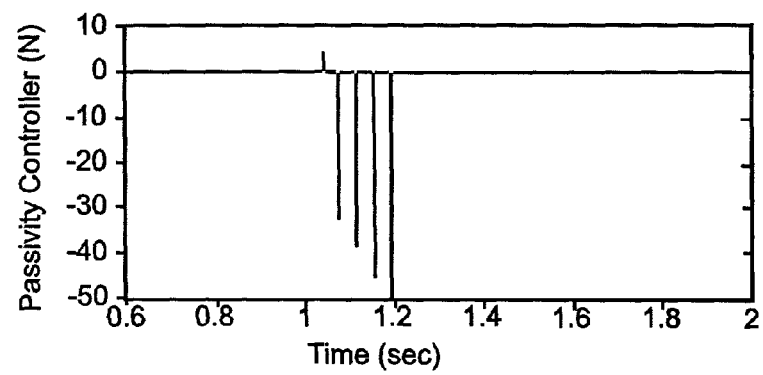

With the PC and resetting turned on, a stable contact is achieved with about 8 bounces (FIG. 22b). Compared to the case without resetting, the contact transient is shorter (8 versus 13 bounces) because the PC operates about 200 msec sooner after the initial contact. Resetting helps the PC to operate exactly and immediately when the system becomes active without changing the stability.

PC Operation on Filtering

In the first experiment, we studied how the filtering work in our haptic system. The filter equation used is as follows:

$$\hat{v}_{k+1} = \eta \hat{v}_k + (1-\eta) v_k \quad (29)$$

where, $0 \leq \eta < 1$ is the filter constant, $\hat{v}_k$ and $v_k$ are the filtered and estimated velocity, respectively.

When $\eta=0.1$ was chosen, and the cut-off frequency was 1.423 KHz, almost equaling the sample rate (1 KHz), we still have noisy PC behavior at low velocity, even though there was no lagging and vibration. There was no filtering. In the case of $\eta=0.25$ (478 Hz), which equals nyquist frequency, we still had a similar result. In the case of $\eta=0.9$ (17 Hz), the filtering worked very well, but the closed-loop system was very unstable with too much vibration. In the case of $\eta=0.62$ (97 Hz), which is a suitable compromise between the attenuation and delay of filter, there still existed much vibration after the contact.

We added velocity thresholding to the experimental system to study how the resetting and velocity threshold work together. The operator approached the virtual object twice in 4 seconds. The contact regime was a highly active one which generated energy after three bounces.

Figure 23A:
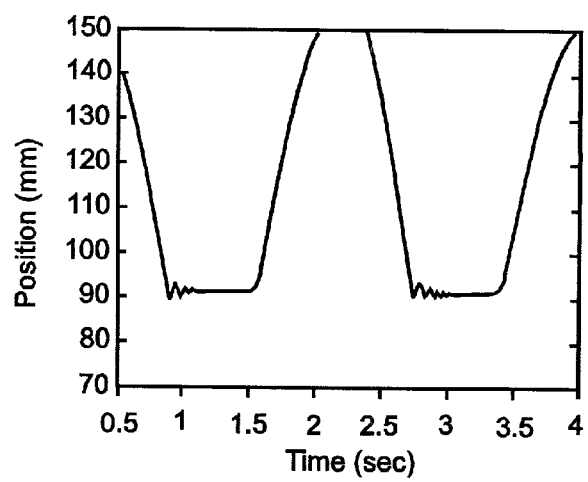
FIG. 23 shows results of experiments involving contact with high stiffness using resetting only without velocity thresholding.
Figure 23B:
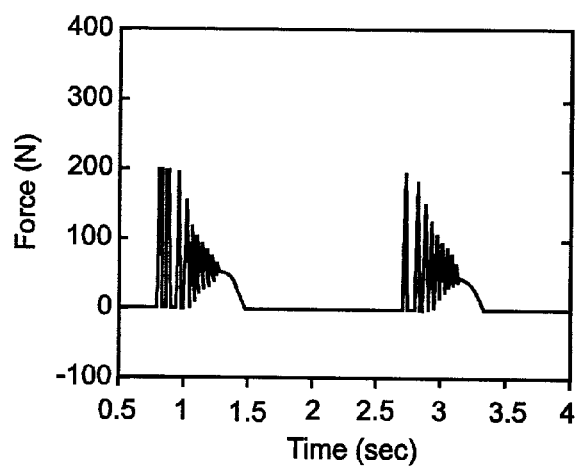
Figure 23C:
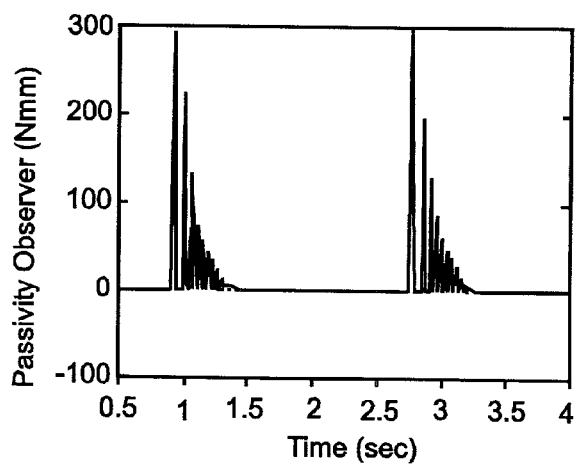
Figure 23D:
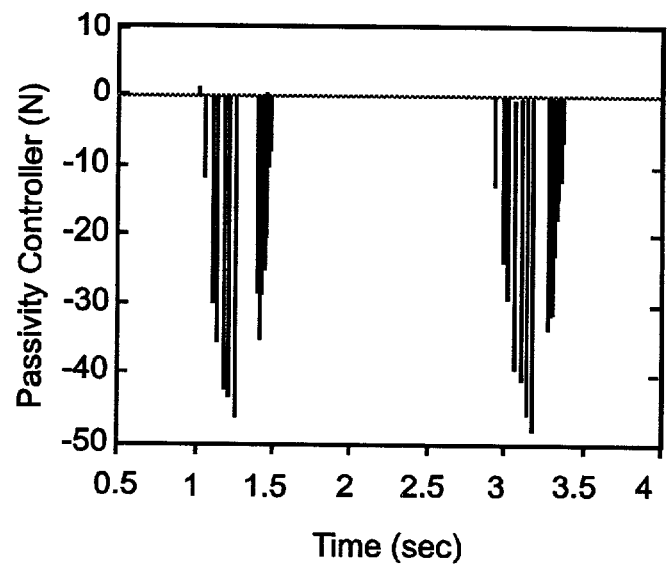
Figure 23E:
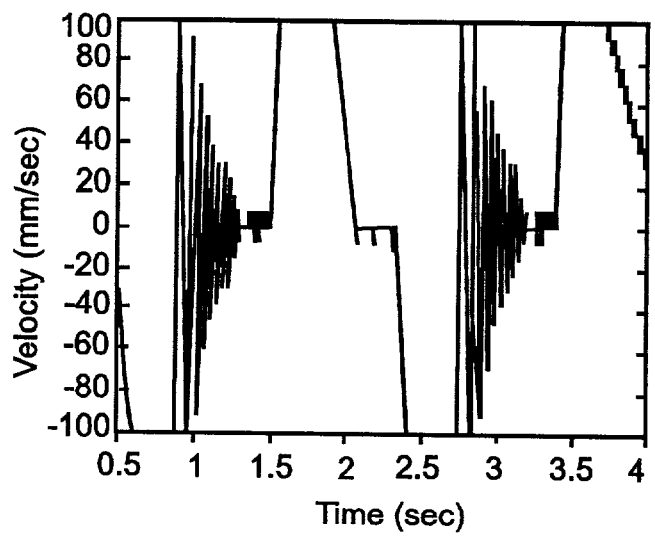
Figure 24A:
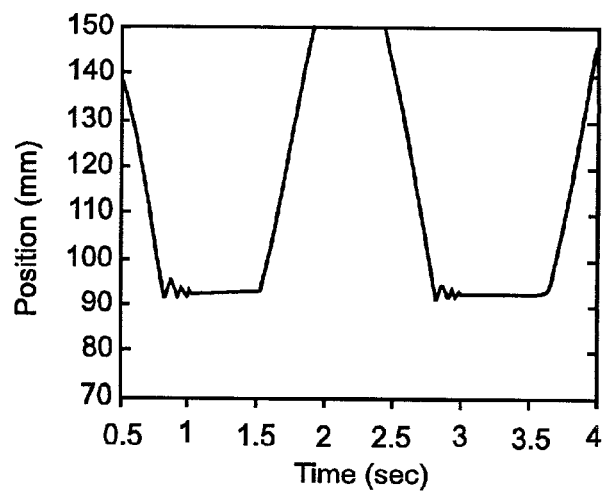
FIG. 24 shows results of experiments involving contact with high stiffness using resetting with velocity thresholding.
Figure 24B:
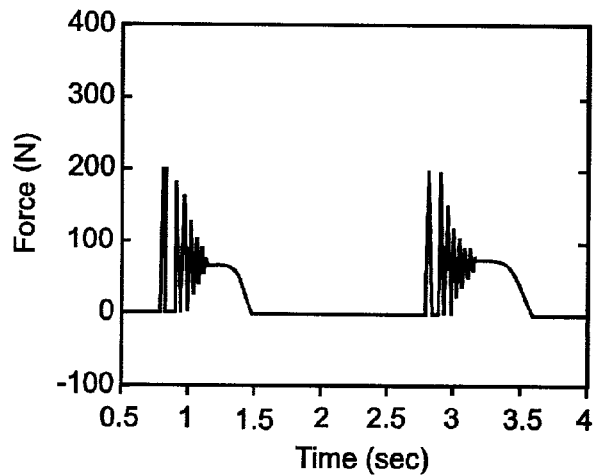
Figure 24C:
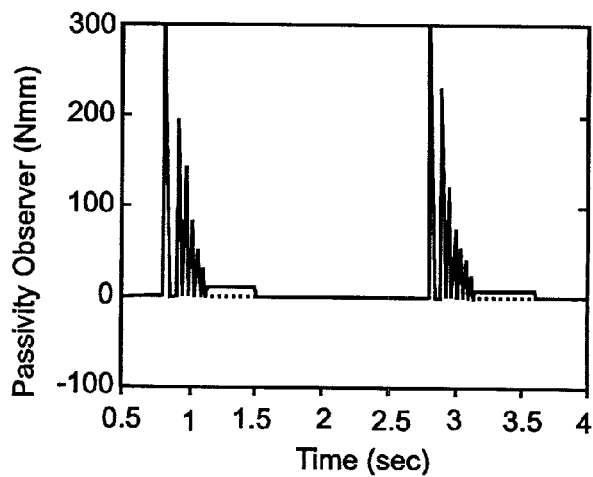
Figure 24D:
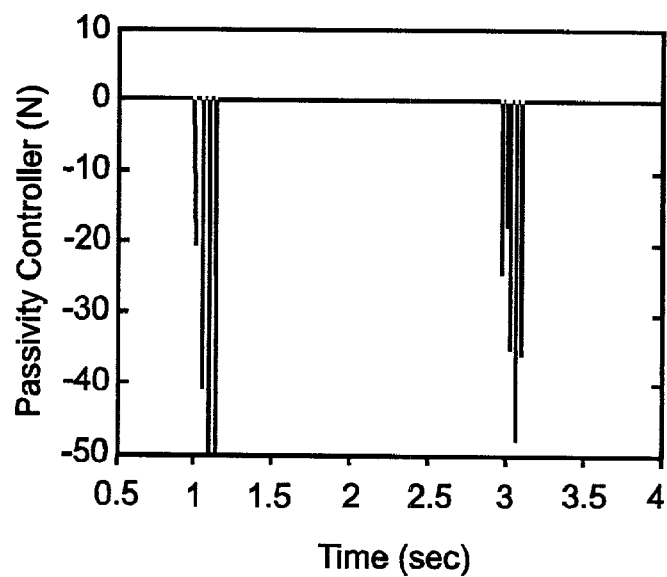
Figure 24E:
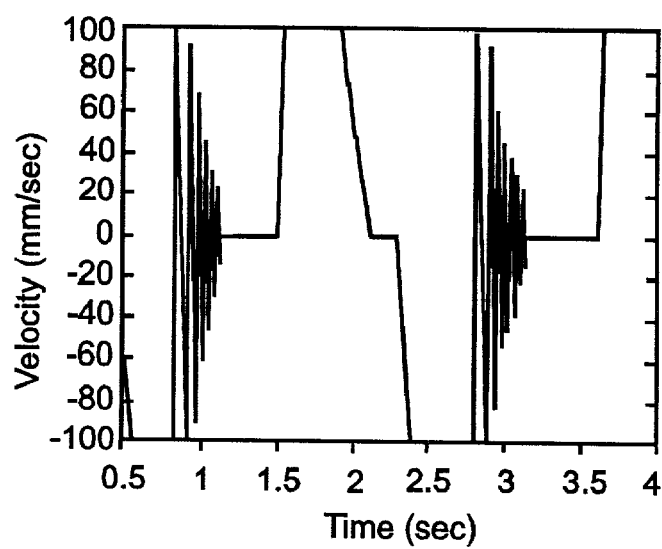
Figure 25:
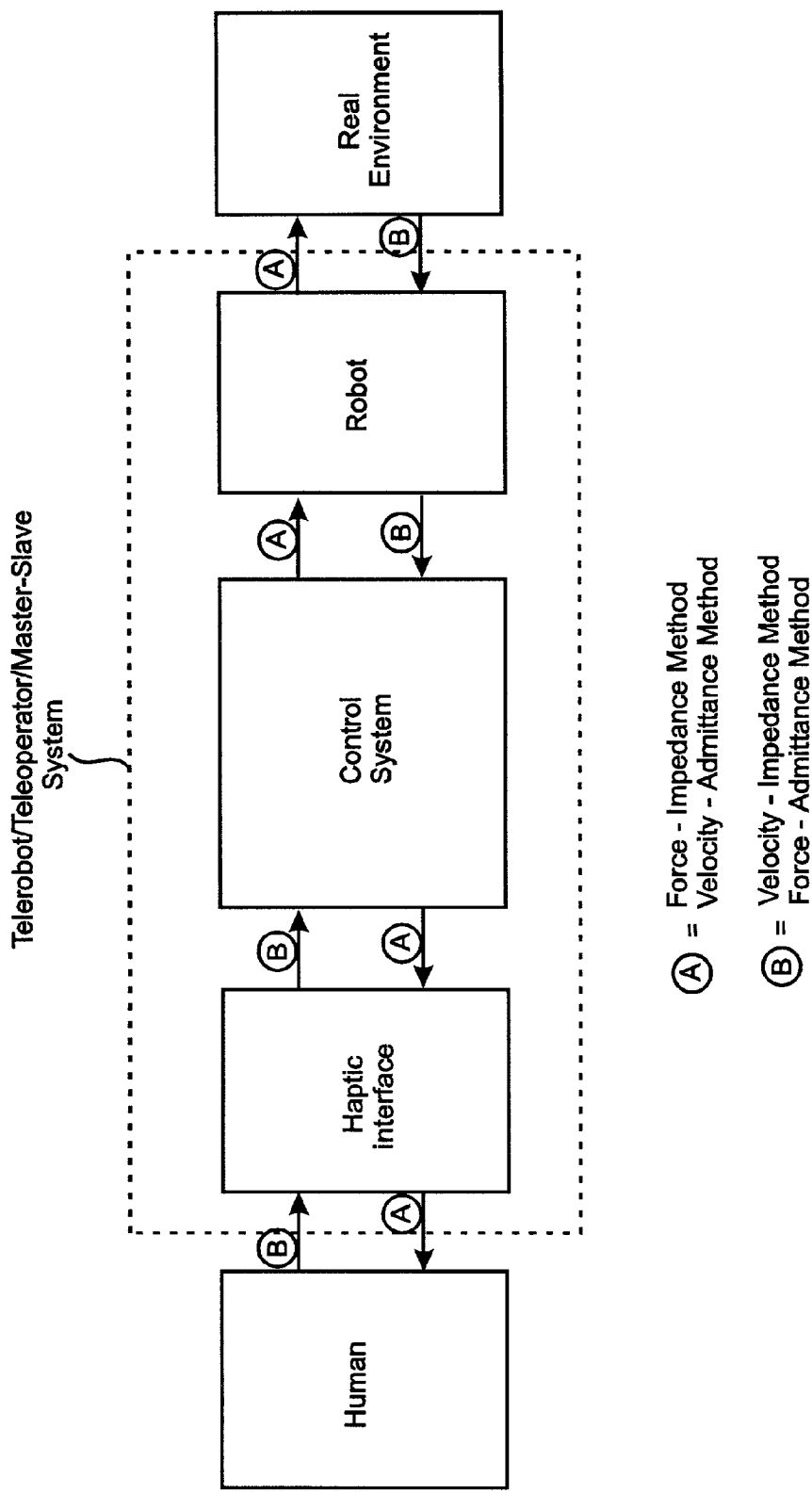
FIG. 25 is a schematic showing operation of a Teleoperator (Telerobot or Master/Slave) system of this invention using combinations of admittance and impedance methods. For the impedance method, the arrows designated "A" represent force and the arrows designated "B" represent velocity. For the admittance method, the arrows designated "A" represent velocity and the arrows designated "B" represent force.

With resetting alone (FIG. 23), the PC (FIG. 23d) operated and a stable contact was achieved after only 9 bounces (FIG. 23b). Resetting removed the stored energy in the PO after the first and second bounce, respectively (FIG. 23c). Noisy behavior of the PC at low velocity can still be seen (FIG. 23d, t=1.4 sec and t=3.3 sec). Finally, both resetting and velocity threshold were applied during PC operation (FIG. 24). With the velocity threshold, the noise in the PC output at low velocity was significantly reduced (FIG. 24d compared to FIG. 23d).

A velocity threshold used to overcome the well known difficulties of computing a noise-free velocity signal reduced noise effects at low velocity. In experiments where both resetting and velocity threshold were applied, it was validated that faster stable contact can be achieved with smaller bounces as well as less sensitivity to noise at low velocity.

The benefits of the PO/PC apply to other types of control systems such as motion control systems.

Although the invention has been shown and described with respect to certain embodiments thereof, it should be understood by those skilled in the art that other various changes and omissions in the form and detail thereof may be made therein without departing from the spirit and scope of the invention as set forth in the appended claims.

What is claimed is:

1. In a virtual-reality system comprising a haptic interface between a user and a virtual environment, a method for stabilizing said interface comprising:

(a) determining the force being applied by a user to an actual element at the haptic interface at a current time increment; or determining movement of a user's body in contact with an actual element at the haptic interface over a current time increment;

(b) when force was determined in step (a), calculating the apparent velocity of the movement which should be displayed by a virtual object in response to said force; and when movement was determined in step (a), calculating a force which should be applied back to the user through an actual element at the haptic interface in contact with the user in order to simulate resistance by a virtual object in the virtual environment to the movement of the user;

(c) computing a Passivity Observer which is a measure of a positive amount of energy dissipated or a negative amount of energy produced by a virtual object at the haptic interface and/or between the haptic interface and the user;

(d) determining for each case in paragraph (c) whether net energy is produced by the virtual object (i.e. whether the Passivity Observer is negative) or is dissipated by the virtual object (i.e. whether the Passivity Observer is positive);

(e) when said determination shows that the virtual object is producing energy, computing a Passivity Controller to determine the amount of damping required to absorb the net energy computed as the Passivity Observer;

(f) when force was determined in step (a), modifying the apparent velocity of the virtual object of step (b) and displaying said velocity such that the net energy computed as the Passivity Controller is absorbed; and when movement was determined in step (a), modifying the force of step (b) and applying said modified force back to the user such that the net energy computed as the Passivity Controller is absorbed; and (g) repeating the foregoing steps over successive time increments.

2. The method of claim 1 wherein in step (a), movement of the user's body is determined.

3. The method of claim 1 wherein in step (a) force is determined.

4. The method of claim 1 wherein in step (a) both movement and force are determined.

5. The method of claim 2 wherein movement is determined by detecting the position of the actual system element and comparing it with the position of the actual system element at the end of the previous time increment, and calculating the estimated velocity of the user's body.

6. The method of claim 5 also comprising applying a filter to the estimated velocity so as to remove noise in the velocity estimate.

7. The method of claim 6 wherein the filter is a threshold function which returns zero velocity if the computed estimated velocity is less than a small predetermined value.

8. The method of claim 2 wherein in step (f) current being supplied to a motor which powers the actual element applying force back to the user is modified in accordance with the amount of damping computed in step (e).

9. The method of claim 1 wherein the Passivity Observer is reset to zero according to a heuristic rule which determines when the Passivity Observer is no longer relevant to the state of contact between the virtual environment and the user.

10. The method of claim 9 wherein the heuristic rule is one that detects a state of lack of contact between the user and objects in the virtual environment.

11. The method of claim 10 wherein the state of lack of contact is detected when the amount of force being applied by the user exceeds a predetermined limit $\epsilon$ for a predetermined period of time $\tau$.

12. The method of claim 11 wherein $\epsilon$ is between about $10^{-1}$ and about $10^{-7}$ times the maximum amount of force the system is capable of exerting.

13. The method of claim 12 wherein $\epsilon$ is about $10^{-3}$ times the maximum amount of force the system is capable of exerting.

14. The method of claim 12 wherein $\tau$ is between the time increments being used for successive iterations of steps (a) through (f) and about 100 times said time increment.

15. The method of claim 14 wherein $\tau$ is about ten times said time increment.

16. The method of claim 13 wherein in step (a), the movements of the user's body and/or of the robot end effector are determined by detecting the positions of the actual system element and of the robot end effector and comparing them with the positions of the actual system element and/or robot end effector, respectively, at the end of the previous time increment, and calculating the estimated velocity of the user's body and/or of the robot end effector.

17. The method of claim 16 also comprising applying filters to the estimated velocities so as to remove noise in the velocity estimates.

18. The method of claim 17 wherein the filters are threshold functions which return zero velocity if the computed estimated velocity is less than a small predetermined value.

19. The system of claim 1 wherein said processor is programmed to reset the Passivity Observer to zero according to a heuristic rule which determines when the Passivity Observer is no longer relevant to the state of contact between the virtual environment and the user.

20. The system of claim 19 wherein the heuristic rule is one that detects a state of lack of contact between the user and objects in the virtual environment.

21. The system of claim 20 wherein the processor is programmed to register a state of lack of contact when the amount of force being applied by the user is less than a predetermined limit $\epsilon$ for a predetermined period of time $\tau$.

22. The system of claim 21 wherein $\epsilon$ is between about $10^{-1}$ and about $10^{-7}$ times the maximum amount of force the system is capable of exerting.

23. The system of claim 22 wherein $\epsilon$ is about $10^{-3}$ times the maximum amount of force the system is capable of exerting.

24. The system of claim 22 wherein $\tau$ is between the time increments being used for successive iterations of paragraphs (a) through (f) and about 100 times said time increment.

25. The system of claim 14 wherein $\tau$ is about ten times said time increment.

26. In a teleoperation system comprising a computerized control system, a robot, and a haptic interface between a user and the control system, a method for stabilizing said teleoperation system, said method comprising:

(a) determining the movement of the user and/or of a robot end effector over a current time increment; or determining the force being applied by a user and/or by a robot end effector to a real environment at a current time increment; or determining the movement of one of the user and/or the robot end effector and determining the force being applied by the other of the user and/or the robot end effector over a current time increment;

(b) when movement was determined in step (a), calculating the corresponding force which should be applied by an actual element at the haptic interface to the user, or by the robot end effector to the real environment, or both, in order to synchronize motion of the robot and the user and to transmit appropriate force information back to the user to simulate resistance to movement of the robot end effector; and when force being applied by a user or a robot end effector was determined in step (a), calculating the apparent velocity of the movement which should be applied to the user at the haptic interface and/or applied to the real environment via the robot end effector, in response to either or both of said forces;

(c) computing a Passivity Observer which is a measure of a positive amount of energy dissipated or a negative amount of energy produced by the control system between the haptic interface and the robot;

(d) determining for each case in paragraph (c) whether net energy is produced by the control system (i.e. whether the Passivity Observer is negative) or is dissipated by the control system (i.e. whether the Passivity Observer is positive);

(e) when said determination shows that the control system is producing energy, computing a Passivity Controller to determine the amount of damping required to absorb the net energy computed as the Passivity Observer;

(f) when movement of the user was determined in step (a), modifying the force of step (b) and applying a modified force back to the user from the haptic interface; when movement by the robot end effector was determined in step (a) modifying the force applied to the real environment by the robot end effector; when force applied by the robot end effector was determined in step (a), modifying the velocity of the robot end effector and displaying said velocity; said modifications being calculated so as to reduce the net energy of the virtual environment by the amount computed as the Passivity Controller; and (g) repeating the foregoing steps over successive time increments.

27. The method of claim 26 wherein force being exerted by the user is determined in step (a).

28. The method of claim 27 wherein movement of the robot end effector is determined in step (a).

29. The method of claim 27 wherein force being exerted by the robot end effector is determined in step (a).

30. The method of claim 26 wherein force being exerted by the robot end effector is determined in step (a).

31. The method of claim 30 wherein force being exerted by the user is determined in step (a).

32. The method of claim 30 wherein movement of the user is determined in step (a).

33. The method of claim 26 wherein the Passivity Observer is reset to zero according to a heuristic rule which determines when the Passivity Observer is no longer relevant to the state of contact between the virtual environment and the user or the virtual environment and the robot end effector.

34. The method of claim 33 wherein the heuristic rule is one that detects a state of lack of contact between the user and objects in the virtual environment.

35. The method of claim 34 wherein the state of lack of contact is detected when the amount of force being applied by the user or to the virtual environment by the robot end effector exceeds a predetermined limit $\epsilon$ for a predetermined period of time $\tau$.

36. The method of claim 35 wherein $\epsilon$ is between about $10^{-1}$ and about $10^{-7}$ times the maximum amount of force the system is capable of exerting.

37. The method of claim 36 wherein $\epsilon$ is about $10^{-3}$ times the maximum amount of force the system is capable of exerting.

38. The method of claim 36 wherein $\tau$ is between the time increments being used for successive iterations of steps (a) through (f) and about 100 times said time increment.

39. The method of claim 38 wherein $\tau$ is about ten times said time increment.

40. A virtual-reality system comprising a haptic interface device providing a stabilized haptic interface, said system comprising: a processor operatively connected to said haptic interface device, input/output devices for transmitting signals from said digital computer to said haptic interface device, said haptic interface device being programmed with virtual reality modeling software capable of computing forces of interaction between actual components of said device and virtual objects in a virtual environment produced by said device; said system also comprising:
(a) computer-controlled force/torque sensors operatively connected to an actual element at the haptic interface to which a user applies force for determining the force being applied thereto by the user at a current time increment; and/or computer-controlled position sensors connected to said actual element for determining movement of a user's body in contact with said actual element over a current time increment;
(b) a digital processor programmed as follows:
    (i) when force was determined in paragraph (a), to receive a signal from said force/torque sensors and to calculate the apparent velocity of the movement which should be displayed by a virtual object in response to said force; and when movement was determined in paragraph (a), to receive a signal from said position sensors and to calculate a force which should be applied back to the user through an actual element at the haptic interface in contact with the user in order to simulate resistance by a virtual object in the virtual environment to the movement of the user;
    (ii) to compute a Passivity Observer which is a measure of a positive amount of energy dissipated or a negative amount of energy produced by a virtual object at the haptic interface; and
    (iii) to determine whether net energy is produced by the virtual object (i.e. whether the Passivity Observer is negative) or is dissipated by the virtual object (i.e. whether the Passivity Observer is positive);
    (iv) when said determination shows that the virtual object is producing energy, to compute a Passivity Controller to determine the amount of damping required to absorb the net energy computed as the Passivity Observer;
    (v) when force/torque sensors were used to determine force applied by the user, to modify the apparent velocity of the virtual object of paragraph (b) and display said velocity such that the net energy computed as the Passivity Controller is absorbed; and when position sensors were used to determine movement of the user, to produce a signal modifying the force of paragraph (b);
(c) hydraulically or electrically powered means for receiving the signal of paragraph (v) and applying said modified force back to the user such that the net energy computed as the Passivity Controller is absorbed;
(d) said processor also being programmed to repeatedly activate the sensors of paragraph (a) at successive time increments.

41. The system of claim 40 comprising position sensors used to determine movement of the user's body.

42. The system of claim 41 wherein said processor is programmed to apply a filter to the estimated velocity so as to remove noise in the velocity estimate.

43. The system of claim 42 wherein the filter is a threshold function which returns zero velocity if the computed estimated velocity is less than a small predetermined value.

44. The system of claim 41 wherein said processor is programmed to provide a signal to modify current being supplied to a motor powering the actual element applying force back to the user in accordance with the amount of damping computed by said processor.

45. The system of claim 40 comprising force/torque sensors to determine force exerted by the user.

46. The system of claim 40 comprising both position and force/torque sensors.

47. A teleoperation system comprising:
(a) position sensors for determining the movement of the user and/or of a robot end effector over a current time increment; and/or force/torque sensors for determining the force being applied by a user and/or a robot end effector to a real environment at a current time increment;
(b) a digital processor programmed as follows:
    (i) when movement was determined in paragraph (a), to receive a signal from said position sensors and to calculate the corresponding force which should be applied by an actual element at the haptic interface to the user, or by the robot end effector to the real environment, or both, in order to synchronize motion of the robot and the user and to transmit appropriate force information back to the user to simulate resistance to movement of the robot end effector; and when force being applied by a user or a robot end effector was determined in paragraph (a), to receive a signal from said force/torque sensors and to calculate the velocity of the movement which should be applied to the user at the haptic interface and/or applied to the real environment via the robot end effector in response to either or both of said forces;
    (ii) to compute a Passivity Observer which is a measure of a positive amount of energy dissipated or a negative amount of energy produced by the control system between the haptic interface and the robot;
    (iii) to determine whether net energy is produced by the control system (i.e. whether the Passivity Observer is negative) or is dissipated by the control system (i.e. whether the Passivity Observer is positive);

(iv) when said determination shows that the control system is producing energy, to compute a Passivity Controller to determine the amount of damping required to absorb the net energy computed by the Passivity Observer;

(v) when position sensors were used to determine movement of the user in paragraph (a), producing a signal to modify the force back to the user from the virtual environment; and/or when position sensors were used to determine movement by the robot end effector in paragraph (a) producing a signal to modify the force applied to the real environment by the robot end effector; when force/torque sensors were used to determine force applied by the robot end effector in paragraph (a), to produce a signal modifying the velocity of the robot end effector of paragraph (b) and display said velocity; said modifications being calculated so as to reduce the net energy by the amount computed as the Passivity Controller; and (vi) to activate said sensors of paragraph (a) at successive time increments; and (c) hydraulically or electrically powered means for moving said actual element and/or said robot end effector in response to signals from said processor.

48. The system of claim 47 comprising force/torque sensors to determine force being exerted by the user in paragraph (a).

49. The system of claim 48 also comprising position sensors to determine movement of the robot end effector in paragraph (a).

50. The system of claim 48 also comprising force/torque sensors to determine force being exerted by the robot end effector in paragraph (a).

51. The system of claim 47 comprising force/torque sensors to determine force being exerted by the robot end effector in paragraph (a).

52. The system of claim 51 also comprising force/torque sensors to determine force being exerted by the user in paragraph (a).

53. The system of claim 51 comprising position sensors to determine movement of the user in paragraph (a).

54. The system of claim 47 comprising in paragraph (a), position sensors to determine the position of the user's body and/or of the robot end effector by detecting the positions of objects in the real environment and of the robot end effector and a processor programmed to compare them with the positions at the previous time increment, and with each other to determine their velocity both individually and relative to each other.

55. The system of claim 47 wherein said processor is also programmed to apply filters to the estimated velocities so as to remove noise in the velocity estimates.

56. The system of claim 55 wherein the filters are threshold functions which return zero velocity if the computed estimated velocity is less than a small predetermined value.

57. The system of claim 47 wherein the Passivity Observer is reset to zero according to a heuristic rule which determines when the Passivity Observer is no longer relevant to the state of contact between the control system and the user or the control system and the robot end effector.

58. The system of claim 57 wherein the heuristic rule is one that detects a state of lack of contact between the robot end effector and objects in the real environment.

59. The system of claim 58 wherein the state of lack of contact is detected when the amount of force being applied by the user by the robot end effector exceeds a predetermined limit $\epsilon$ for a predetermined period of time $\tau$.

60. The system of claim 59 wherein $\epsilon$ is between about $10^{-1}$ and about $10^{-7}$ times the maximum amount of force the system is capable of exerting.

61. The system of claim 60 wherein $\epsilon$ is about $10^{-3}$ times the maximum amount of force the system is capable of exerting.

62. The system of claim 60 wherein $\tau$ is between the time increments being used for successive iterations of paragraphs (a) through (f) and about 100 times said time increment.

63. The system of claim 62 wherein $\tau$ is about ten times said time increment.

* * * * *